US010172167B2

(12) United States Patent
Yeom et al.

(10) Patent No.: US 10,172,167 B2
(45) Date of Patent: Jan. 1, 2019

(54) ELECTRONIC DEVICE AND CONNECTION METHOD THEREOF

(71) Applicant: Samsung Electronics Co., Ltd., Gyeonggi-do (KR)

(72) Inventors: Dong-Hyun Yeom, Gyeonggi-do (KR); Tae-Ho Kim, Chungcheongbuk-do (KR); Seok-Hyun Yoon, Gyeonggi-do (KR); Ju-Ah Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/139,984

(22) Filed: Apr. 27, 2016

(65) Prior Publication Data

US 2016/0366708 A1 Dec. 15, 2016

(30) Foreign Application Priority Data

Jun. 12, 2015 (KR) ........................ 10-2015-0083486

(51) Int. Cl.
*H04W 76/10* (2018.01)
*H04W 4/80* (2018.01)
*H04W 8/00* (2009.01)

(52) U.S. Cl.
CPC ............. *H04W 76/10* (2018.02); *H04W 4/80* (2018.02); *H04W 8/005* (2013.01)

(58) Field of Classification Search
CPC ...... H04W 76/02; H04W 4/008; H04W 8/005
USPC ................................................ 455/41.1–41.3
See application file for complete search history.

(56) References Cited

U.S. PATENT DOCUMENTS

| 2014/0080469 | A1* | 3/2014 | Ko | H04W 4/20 455/418 |
| 2014/0351479 | A1* | 11/2014 | Lee | H04W 76/14 710/303 |
| 2016/0088615 | A1* | 3/2016 | Soyak | H04W 72/0426 370/254 |

FOREIGN PATENT DOCUMENTS

JP 5531487 6/2014
KR 1020100067335 6/2010

* cited by examiner

*Primary Examiner* — Nay A Maung
*Assistant Examiner* — Angelica M Perez
(74) *Attorney, Agent, or Firm* — The Farrell Law Firm, P.C.

(57) ABSTRACT

Disclosed are an electronic device for making a connection with an external electronic device and a method of operating the same. A method of operating a first electronic device includes acquiring virtual device information associated with a second electronic device and connection information between the second electronic device and one or more third electronic devices, which is generated based on the virtual device information, and making a connection with the one or more third electronic devices through short range wireless communication by using the virtual device information and the connection information.

19 Claims, 17 Drawing Sheets

ELECTRONIC DEVICE AND CONNECTION METHOD THEREOF

PRIORITY

This application claims priority under 35 U.S.C. § 119(a) to Korean Patent Application Serial No. 10-2015-0083486, which was filed in the Korean Intellectual Property Office on Jun. 12, 2015, the entire content of which is incorporated herein by reference.

BACKGROUND

1. Field of the Disclosure

The present disclosure generally relates to an electronic device, and more particularly to a connection method thereof for connecting various electronic devices by using virtual device information.

2. Description of the Related Art

Recently, electronic devices such as smart phones, tablet PCs, wearable devices, and the like have been diversified. The electronic devices are assigned unique media access control (MAC) addresses (for example, BD_ADDR in Bluetooth) according to each wireless communication scheme when the electronic device is manufactured. In order for a pair of electronic devices to be connected to each other, the devices use their MAC addresses to be authenticated, and perform communication. Further, in a case of a pairing scheme (for example, a Bluetooth scheme) that additionally requires a link key, a pair of electronic devices are connected to each other through a pairing process for generating the link key.

A pair of electronic devices making a connection may search for an electronic device to be connected to when the connection is attempted and perform a separate connection process through an authentication procedure or for generating a link key. After the connection is made, the electronic device repeats the same connection process through the authentication procedure or for generating the link key in order to make a connection with another device, which delays the connection process and causes user inconvenience.

When a plurality of electronic devices are connected to one electronic device, the one electronic device operates as a hub and manages the neighboring electronic devices. Accordingly, when an electronic device, which operates as a hub, is changed in a network in which a plurality of electronic devices communicate with each other, a connection process through an authentication procedure or for generating a link key is individually performed between each of the connected neighboring electronic devices and a new electronic device, which operates as the hub, thereby delaying the connection process and increases user inconvenience.

SUMMARY

In accordance with an aspect of the present disclosure, a method of operating a first electronic device is provided. The method includes acquiring virtual device information associated with a second electronic device and connection information between the second electronic device and one or more third electronic devices, which is generated based on the virtual device information, and making a connection with the one or more third electronic devices through short range wireless communication by using the virtual device information and the connection information.

In accordance with another aspect of the present disclosure, a first electronic device is provided. The first electronic device includes a communication module, and a processor that acquires virtual device information associated with a second electronic device and connection information between the second electronic device and one or more third electronic devices, which is generated based on the virtual device information and makes a connection with the one or more third electronic devices through short range wireless communication by using the virtual device information and the connection information through the communication module.

In accordance with another aspect of the present disclosure, a method of operating a second electronic device is provided. The method includes acquiring virtual device information associated with the second electronic device, making a connection with one or more third electronic devices through short range wireless communication by using the virtual device information, and transmitting the virtual device information and connection information between the second electronic device and one or more third electronic devices, which is generated based on the virtual device information, to a first electronic device.

In accordance with another aspect of the present disclosure, a second electronic device is provided. The second electronic device includes, a communication module, and a processor that acquires virtual device information associated with the second electronic device, makes a connection with one or more third electronic devices through short range wireless communication by using the virtual device information through the communication module, and transmits the virtual device information and connection information between the second electronic device and one or more third electronic devices, which is generated based on the virtual device information, to a first electronic device through the communication module.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
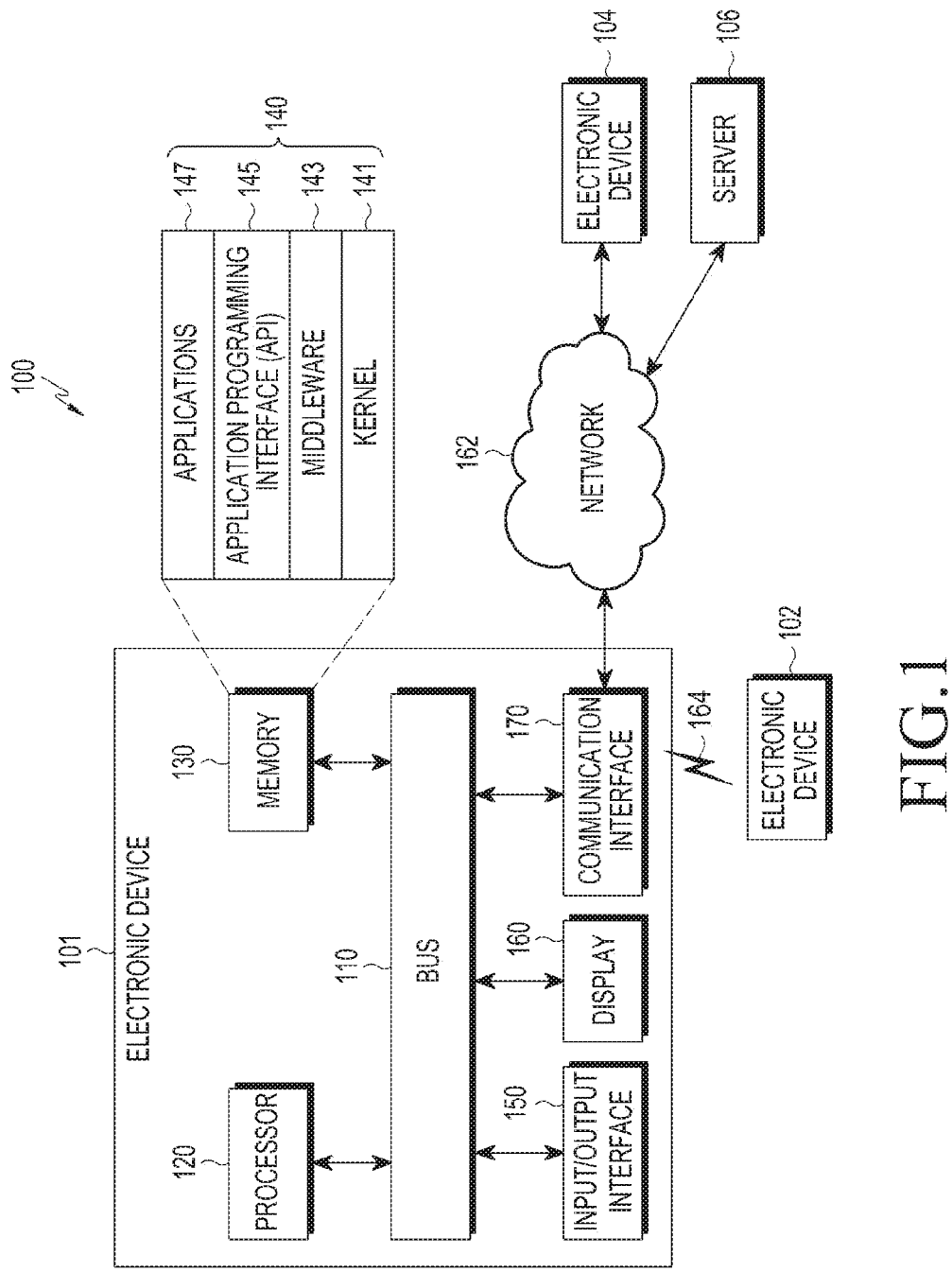
FIG. 1 illustrates a network environment including an electronic device according to various embodiments of the present disclosure.

Hereinafter, various embodiments of the present disclosure will be described with reference to the accompanying drawings. However, it should be understood that there is no limiting the present disclosure to the particular forms disclosed herein, rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as a component), and do not exclude one or more additional features.

In the present disclosure, the expressions "A or B", "at least one of A or/and B", or "one or more of A or/and B" may include all possible combinations of the items listed. For example, the expressions "A or B", "at least one of A and B", or "at least one of A or B" refers to all of (1) including at least one A, (2) including at least one B, or (3) including all of at least one A and at least one B.

The expressions "a first", "a second", "the first", or "the second" used in various embodiments of the present disclosure may modify various components regardless of the order and/or the importance but do not limit the corresponding components. For example, a first user device and a second user device refer to different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it is understood that when an element (e.g., first element) is referred to as being "directly connected," or "directly coupled" to another element (second element), there are no elements (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may refer to a dedicated processor (e.g. embedded processor) only for performing the corresponding operations or a general-purpose processor (e.g., central processing unit (CPU) or application processor (AP)) that may perform the corresponding operations by executing one or more software programs stored in a memory device.

The terms used herein are merely for the purpose of describing particular embodiments and do not limit the scope of other embodiments. As used herein, singular forms may include plural forms as well unless the context clearly indicates otherwise. Unless defined otherwise, all terms used herein, including technical and scientific terms, have the same meanings as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even the terms defined in the present disclosure should not be interpreted to exclude embodiments of the present disclosure.

An electronic device, according to various embodiments of the present disclosure, may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an MPEG-1 audio layer-3 (MP3) player, a mobile medical device, a camera, and a wearable device. The wearable device may include at least one of an accessory type (e.g., a watch, a ring, a bracelet, an anklet, a necklace, eye glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to an embodiment of the present disclosure, the electronic device may be a home appliance. The home appliance may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic, resonance angiography (MRA), a magnetic resonance imaging (MRI), a computed tomography (CT) machine, an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM), point of sales (POS) terminal, or Internet of Things device (e.g., a light bulb, various sensors, electric or gas meter, a sprinkler device, a fire alarm, a thermostat, a streetlamp, a toaster, d sporting good, a hot water tank, a heater, a boiler, etc.).

According to an embodiment of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may be a flexible device. Further, the electronic device is not limited to the aforementioned devices, and may include a new electronic device according to the development of new technologies.

Hereinafter, an electronic device, according to various embodiments of the present disclosure, will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure;

An electronic device 101 within a network environment 100, according to various embodiments of the present disclosure, will be described with reference to FIG. 1. The electronic device 101 includes a bus 110, a processor 120, a memory 130, an input/output interface 150, a display 160, and a communication interface 170. In some embodiments, the electronic device 101 may omit at least one of the above elements or may include other elements.

The bus 110 may include, for example, a circuit for interconnecting the elements 110 to 170 and transferring communication (for example, control messages and/or data) between the elements.

The processor 120 may include one or more of a Central Processing Unit (CPU), an Application Processor (AP), and a Communication Processor (CP). For example, the processor 120 may carry out operations or data processing related to control and/or communication of at least one other component of the electronic device 101.

The memory 130 may include a volatile memory and/or a non-volatile memory. The memory 130 may store, for example, instructions or data relevant to at least one other element of the electronic device 101. According to an embodiment of the present disclosure, the memory 130 may store software and/or a program 140. The program 140 includes a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (for example, the bus 110, the processor 120, or the memory 130) used for performing an operation or function implemented by the other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, and the like) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instructions) for file control, window control, image processing, or text control.

The input/output interface 150 may function as, for example, an interface that transfers instructions or data input from a user or another external device to the other element(s) of the electronic device 101. Furthermore, the input/output interface 150 may output instructions or data received from the other element(s) of the electronic device 101 to the user or external devices.

The display 160 may include, for example, a liquid crystal display (LCD), a light-emitting diode (LED) display, an organic light-emitting diode (OLED) display, a microelectromechanical Systems (MEMS) display, and an electronic paper display. The display 160 may display, for example, various types of content (for example, text, images, videos, icons, or symbols) to the user. The display 160 may include a touch screen, and may receive, for example, a touch, gesture, proximity, or hovering input by using an electronic pen or a part of the user's body.

The communication interface 170 may set communication between, for example, the electronic device 101 and an external device (for example, a first external electronic device 102, a second external electronic device 104, or a server 106). For example, the communication interface 170 may be connected to a network 162 through wireless or wired communication to communicate with the external device 104 or the server 106.

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164.

The short range communication 164 may include, for example, at least one of Wi-Fi, Bluetooth, near field communication (NFC), global navigation satellite system (GNSS), and the like. The GNSS may include at least one of, for example, a global positioning system (GPS), a global navigation satellite system (Glonass), a Beidou navigation satellite system ("Beidou"), and a European global satellite-based navigation system (Galileo), according to a use area, a bandwidth, and the like. Hereinafter, "GPS" may be used interchangeably with "GNSS" in this document. The wired communication may include, for example, at least one of a universal serial bus (USB), a high definition multimedia interface (HDMI), recommended standard 232 (RS-232), and a plain old telephone service (POTS). The network 162 may include at least one of a communication network such as a computer network (for example, a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. All or some of the operations performed in the electronic device 101 may be performed in another electronic device or a plurality of electronic devices 102, 104 or the server 106). When the electronic device 101 has to perform some functions or services automatically or in response to a request, the electronic device 101 may make a request for performing at least some functions relating thereto to another device 102, 104, or the server 106, instead of performing the functions or services by itself or in addition. Another electronic device 102, 104, or the server 106, may execute the requested functions or the additional functions, and may deliver a result of the execution to the electronic device 101. The electronic device 101 may provide the requested functions or services based on the received result as it is or after additionally processing the received result. To achieve this, for example, cloud computing, distributed computing, or client-server computing technology may be used.

The processor 120 may process at least some of the information obtained from other components (for example, at least one of the memory 130, the input/output interface 150, and the communication interface 170) and utilize the same in various manners. For example, the processor 120 may control at least some functions of the electronic device 101 so that the electronic device 101 may interwork with other electronic devices 102, 104 or the server 106. The processor 120 may be integrated with the communication interface 170. According to an embodiment of the present disclosure, at least one component of the processor 120 may be included in the server 106 and at least one operation implemented by the processor 120 may be executed by the server 106.

According to an embodiment of the present disclosure, the memory 130 may include instructions to operate the processor 120. For example, the memory 130 may include instructions for allowing the processor 120 to control other elements of the electronic device 101 and to interwork with other electronic devices 102 and 104 or the server 106. The processor 120 may control other components of the electronic device 101 and interwork with other electronic devices 102 and 104 or the server 106 based on the instructions stored in the memory 130. Hereinafter, the operations of the electronic device 101 will be described based on the respective components of the electronic device 101. Further, the instructions for allowing the respective components to perform the operations may be included in the memory 130.

According to various embodiments of the present disclosure, the communication interface 170 may include a plurality of communication modules that support various communication schemes. For example, the communication interface 170 may include a cellular module, a Wi-Fi module, a Bluetooth module, a GNSS module, an NFC module, an RF module, and the like.

According to various embodiments of the present disclosure, an electronic device may make a connection with one or more other electronic devices near the electronic device by using Virtual device information.

Accordingly, after the connection, a separate connection process may not be required to be performed by transmitting the virtual device information and connection information with the one or more other electronic devices generated based on the virtual device information to make the connection with the other electronic devices.

Further, even when the electronic device operating as a hub is changed, an individual connection process between a new electronic device, which operates as the hub, and neighboring electronic devices may not be required to be performed by transmitting the virtual device information and the connection information to the new electronic device, which operates the hub.

Hereinafter, an electronic device, which performs a connection by using virtual device information and connection information generated based on the virtual device information, is defined as a first electronic device, an electronic device, which transmits the virtual device information and the connection information to the first electronic device, is defined as a second electronic device, and an electronic device, to which the first electronic device transmits the virtual device information and the connection information, is defined as a fourth electronic device. Further, an electronic device, which is connected to each of the first electronic device, the second electronic device, and the fourth electronic device, is defined as the third electronic device. However, the first electronic device to the fourth electronic device are distinguished from each other, but the first electronic device to the fourth electronic device may be configured to be the same as the electronic device 101 of FIG. 1 and perform the same operations.

According to various embodiments of the present disclosure, the first electronic device may acquire virtual device information related to the second electronic device and connection information between the second electronic device and one or more third electronic devices. The connection information is generated based on the virtual device information. The first electronic device may maintain the connection with the one or more third electronic devices on behalf of the second electronic device by acquiring the virtual device information and the connection information.

According to various embodiments of the present disclosure, the first electronic device may acquire the virtual device information and the connection information from a server, which manages the virtual device information and the connection information, and acquire the virtual device information and the connection information from the second electronic device.

Further, the first electronic device may acquire the virtual device information and the connection information even though a communication module for performing communication (for example, Wi-Fi, Bluetooth, and the like) using the virtual device information and the connection information is deactivated. The first electronic device may activate the communication module by acquiring the virtual device information and the connection information. The first electronic device may activate the communication module and maintain the connection with the third electronic device by using the virtual device information and the connection information. As described above, the first electronic device may receive the virtual device information and the connection information regardless of whether the communication module is activated or not.

The server and the second electronic device may transmit the virtual device information and the connection information to the first electronic device regardless of whether the communication module of the first electronic device is activated or not. However, when the first electronic device does not have a capability to perform communication using the virtual device information and the connection information, the server and the second electronic device may not transmit the virtual device information and the connection information to the first electronic device. Further, the server and the second electronic device may identify the capability of the first electronic device, adjust the virtual device information and the connection information to correspond to the capability of the first electronic device based on the capability of the first electronic device, and transmit the adjusted virtual device information and connection information.

For example, the server and the second electronic device may identify the capability of the first electronic device and determine whether the first electronic device may perform the communication using the virtual device information and the connection information. When it is determined that the first electronic device may perform the communication, the server and the second electronic device may transmit the virtual device information and the connection information. However, if it is determined that the first electronic device cannot perform the communication, the server and the second electronic device may not transmit the virtual device information and the connection information. Further, the server and the second electronic device may adjust information related to service quality included in the virtual device information and the connection information to correspond to the identified capability of the first electronic device and transmit the adjusted information to the first electronic device.

However, the above is only an example for describing the present disclosure, and the present disclosure is not limited thereto. The server and the second electronic device may adjust not only the information related to the service quality but also any information included in the virtual device information and the connection information to correspond to the capability of the first electronic device such as an application installed in the first electronic device, processing power, codec processing capability, and the like, and transmit the adjusted information.

According to various embodiments of the present disclosure, the virtual device information may be virtual device information which may be used for a connection between electronic devices, instead of using unique device information of the electronic device. For example, the virtual device information may be virtual device information corresponding to actual device information such as a virtual MAC address, a virtual serial number, a virtual UUID, a virtual world wide port name (WWPN), and the like.

The virtual device information may be directly generated and managed by the electronic device or may be generated and managed by an external server. When the virtual device information is generated by the external server, the server may assign the virtual device information per electronic device or assign the virtual device information per user account related to the electronic device.

According to various embodiments of the present disclosure, the connection information may be generated based on the virtual device information. The connection information may be information generated during a process in which the second electronic device makes the connection with the one or more third electronic device through short range wireless communication based on the virtual device information. The second electronic device may acquire the virtual device information from the external server or may generate the virtual device information. As described above, the second electronic device may generate the connection information during a process for making the connection with the one or more third electronic devices through short range wireless communication based on the acquired or generated virtual device information.

For example, when the connection between the second electronic device and the one or more third electronic devices is made through a Bluetooth scheme, the second electronic device may generate a link key based on the virtual device information. The second electronic device may make the connection with the one or more third electronic device by using the generated link key. In this case, the connection information may include the link key generated based on the virtual device information.

Further, when the connection between the second electronic device and the one or more third electronic devices is made through a network such as digital living network alliance (DLNA), the second electronic device may generate one or more pieces of profile information for configuring the network based on the virtual device information. Each of the pieces of profile information may be information indicating the roles which the electronic devices included in the network play. In a process for configuring the network, the role of each of the electronic devices included in the network may be determined according to the profile information.

According to various embodiments of the present disclosure, the second electronic device may configure the network by using one of the one or more pieces of profile information and make the connection with the one or more third electronic devices. In this case, the connection information may be generated to correspond to each of the one or more pieces of profile information generated based on the virtual device information.

According to various embodiments of the present disclosure, the first electronic device may make the connection with the one or more third electronic devices through short range wireless communication based on the virtual device information and the connection information. Since the first electronic device uses the virtual device information and the connection information, the first electronic device may not have an additional operation required for the connection with each of the one or more third electronic devices. Further, by using the virtual device information and the connection information, the first electronic device may make the connection with the one or more third electronic devices in the same way as that of the connection between the second electronic device and the one or more third electronic devices. The additional operation required for the connection may vary depending on each short range communication scheme, and may include a general connection process operation in which the connection between electronic devices is made through short range wireless communication.

According to various embodiments of the present disclosure, the first electronic device may set device information of the first electronic device as the acquired virtual device information in an operation for making the connection with the third electronic device. For example, the first electronic device may change a MAC address of the first electronic device from a unique MAC address of the first electronic device to a virtual MAC address included in the virtual device information. Accordingly, on behalf of the second electronic device, the first electronic device may uniformly maintain the connection between the second electronic device and the one or more third electronic devices without any additional operation required for the connection with the one or more third electronic devices.

As described above, the connection between the second electronic device and the one or more third electronic devices may switch to the connection between the first electronic device and the one or more third electronic devices without any additional operation. The first electronic device may uniformly maintain the connection with the third electronic device on behalf of the second electronic device.

According to various embodiments of the present disclosure, the first electronic device may make the connection with the one or more third electronic devices through short range wireless communication by using a network configuration based on the virtual device information and the connection information. The network may be configured according to the virtual device information and the connection information. Accordingly, the first electronic device may maintain the connection with the one or more third electronic devices by making the connection with the one or more third electronic devices through the network on behalf of the second electronic device.

According to various embodiments of the present disclosure, the first electronic device may identify a fourth electronic device, which may be connected to the one or more third electronic devices through the short range wireless communication. The first electronic device may continuously identify whether a new device approaches an area in which the connection with the one or more third electronic devices through the short range wireless communication is possible or whether an electronic device within the area transitions to a use mode.

The first electronic device may transmit the virtual device information and the connection information to the fourth electronic device. Due to the acquisition of the virtual device information and the connection information, like the first electronic device, the fourth electronic device may maintain the connection with the one or more third electronic devices by making the connection with the one or more third electronic devices on behalf of the first electronic device without any additional operation required for the connection with the one or more electronic devices.

Like the first electronic device, the fourth electronic device may acquire the virtual device information and the connection information even when a communication module for performing the communication using the virtual device information and the connection information is deactivated. The fourth electronic device may activate the communication module by acquiring the virtual device information and the connection information.

Further, the first electronic device may identify a capability of the fourth electronic device and determine whether to transmit the virtual device information and the connection information according to whether the fourth electronic device supports the communication using the virtual device information and the connection information. The first electronic device may adjust the virtual device information and the connection information in accordance with the capability of the fourth electronic device and transmit the adjusted virtual device information and connection information.

When the first electronic device transmits the virtual device information and the connection information to the fourth electronic device, the first electronic device may set the device information of the first electronic device as unique device information of the first electronic device. For example, the first electronic device may return the device information of the first electronic device, which has been changed to the virtual device information, to the unique device information of the electronic device. In order to prevent the virtual device information from being duplicated due to the transmission of the virtual device information to the fourth electronic device, the first electronic device may set the device information of the first electronic device as the unique device information of the first electronic device.

According to various embodiments of the present disclosure, the first electronic device may identify the fourth electronic device, which may be connected to the one or more third electronic devices through the short range wireless communication by using the network. The first electronic device may continuously identify whether a new device approaches an area in which the connection is possible through the network or whether the electronic device within the area transitions to a use mode. The first electronic device may transmit one or more pieces of profile information for a network configuration corresponding to the capability of the fourth electronic device or a list of the one or more pieces of profile information to the identified fourth electronic device.

The fourth electronic device may display to a user the one or more pieces of received profile information or the received list of the one or more pieces of profile information through the display. The user may select one piece of profile information from the one or more pieces of displayed profile information or the displayed list of the one or more pieces of displayed profile information. The fourth electronic device may transmit a signal indicating the selection of the profile information to the first electronic device or the server.

According to various embodiments of the present disclosure, when the profile information corresponding to the capability of the fourth electronic device is selected, the first electronic device may transmit the virtual device information and connection information corresponding to the selected profile information to the fourth electronic device. When the first electronic device receives a signal indicating the selection of the profile information from the server or the fourth electronic device, the first electronic device may transmit the virtual device information and the connection information corresponding to the selected profile information to the fourth electronic device. Based on the received virtual device and connection information, the fourth electronic device may make the connection with the one or more third electronic devices through the network on behalf of the first electronic device.

Figure 2:
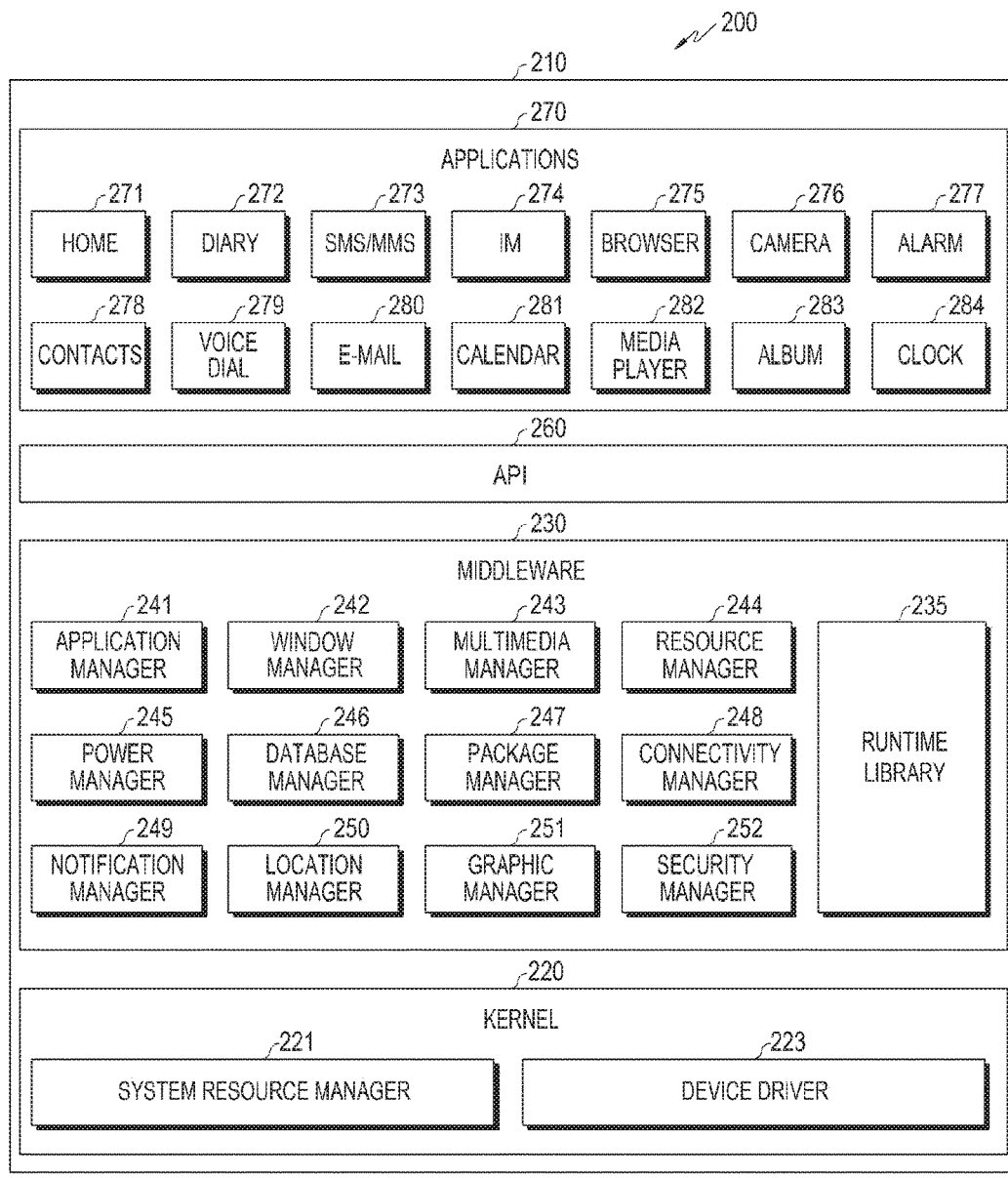
FIG. 2 is a block diagram of a program module according to various embodiments of the present disclosure.

FIG. 2 is a block diagram of a program module according to various embodiments of the present disclosure. The program module 210 (for example, the program 140) includes an Operating System (OS) for controlling resources related to the electronic device (for example, the electronic device 101) and/or various applications (for example, the application programs 147) executed in the operating system. The operating system may be, for example, Android™, iOS™, Windows™, Symbian™, Tizen™, Bada™, and the like:

The program module 210 includes a kernel 220, middleware 230, an application programming interface (API) 260, and/or applications 270. At least some of the program module 210 may be preloaded on the electronic device 101, or may be downloaded from an external electronic device 102, 104, or the server 106.

The kernel 220 (for example, the kernel 141) includes a system resource manager 221 and/or a device driver 223. The system resource manager 221 may control, assign, or collect system resources. According to an embodiment of the present disclosure, the system resource manager 221 may include a process manager, a memory manager, or a file system manager. The device driver 223 may include, for example, a display driver, a camera driver, a Bluetooth driver, a shared memory driver, a USB driver, a keypad driver, a Wi-Fi driver, an audio driver, or an inter-process communication (IPC) driver.

The middleware 230 may provide, for example, a function commonly required by the applications 270, or may provide various functions to the applications 270 through the API 260 so that the applications 270 may efficiently use limited system resources within the electronic device 101. According to an embodiment of the present disclosure, the middleware 230 (for example, the middleware 143) includes at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a compiler uses in order to add new functions through a programming language while the applications 270 are executed. The runtime library 235 may perform input/output management, memory management, or a function for an arithmetic function.

The application manager 241 may manage, for example, a life cycle of at least one of the applications 270. The window manager 242 may manage graphical user interface (GUI) resources used on a screen. The multimedia manager 243 may identify formats required for the reproduction of various media files and encode or decode a media file using a codec suitable for the corresponding format. The resource manager 244 may manage resources of at least one of the applications 270, such as a source code, a memory, and a storage space.

The power manager 245 may operate together with, for example, a Basic Input/Output System (BIOS) to manage a battery or power and may provide power information required for the operation of the electronic device 101. The database manager 246 may generate, search, or change a database to be used in at least one of the applications 270. The package manager 247 may manage the installation or the updating of an application distributed in the form of a package file.

The connectivity manager 248 may manage a wireless connection such as, for example, Wi-Fi or Bluetooth. The notification manager 249 may display or notify of an event, such as an arrival message, an appointment, proximity notification, and the like, in such a manner to not disturb a user. The location manager 250 may manage location information of the electronic device 101. The graphic manager 251 may manage a graphic effect to be provided to a user and a user interface relating to the graphic effect. The security manager 252 may provide all security functions required for system security or user authentication. According to an embodiment, when the electronic device 101 has a telephone call function, the middleware 230 may further include a telephony manager for managing a voice call function or a video call function of the electronic device 101.

The middleware 230 may include a middleware module that forms combinations of various functions of the above described elements. The middleware 230 may provide specialized modules according to types of operating systems in order to provide differentiated functions. Furthermore, the middleware 230 may dynamically remove some of the existing elements, or may add new elements.

The API 260 (for example, the API 145) is, for example, a set of API programming functions, and may be provided with a different configuration according to an OS. For example, in the case of Android™ or iOS™, one API set may be provided for each platform, and in the case of Tizen™, two or more API sets may be provided for each platform.

The applications 270 (for example, the application programs 147) includes one or more applications that may provide functions, such as home 271, dialer 272, SMS/MMS 273, instant message (IM) 274, browser 275, camera 276, alarm 277, contacts 278, voice dial 279, email 280, calendar 281, media player 282, album 283, clock 284, health care (for example, measure exercise quantity or blood sugar level), or environmental information (for example, atmospheric pressure, humidity, or temperature information).

According to an embodiment of the present disclosure, the applications 270 may include an application (hereinafter, referred to as an "information exchange application") supporting information exchange between the electronic device 101 and an external electronic device 102 or 104. The application associated with exchanging information may include, for example, a notification relay application for notifying an external electronic device of certain information or a device management application for managing an external electronic device.

For example, the notification relay application may include a function of transferring, to the external electronic device 102 or 104, notification information generated from other applications of the electronic device 101 (for example, an SMS/MMS application, an e-mail application, a health management application, or an environmental information application). Further, the notification relay application may receive notification information from, for example, the external electronic device and provide the received notification information to the user.

The device management application may manage (for example, install, delete, or update), at least one function of an external electronic device 102 or 104, communicating with the electronic device (for example, a function of turning on/off the external electronic device itself (or some components) or a function of adjusting luminance (or a resolution) of the display, applications operating in the external electronic device, or services provided by the external electronic device (for example, a call service and a message service).

According to an embodiment of the present disclosure, the applications 270 may include applications (for example, a health care application of a mobile medical appliance and the like) designated according to attributes of the external electronic device 102 or 104. The applications 270 may include an application received from the external electronic device 102, 104, or the server 106. The applications 270 may include a preloaded application or a third party application which may be downloaded from the server. Names of the elements of the program module 210, according to the above-described embodiments of the present disclosure, may change depending on the type of OS.

According to an embodiment of the present disclosure, at least some of the program module 210 may be implemented in software, firmware, hardware, or a combination of two or more thereof. At least some of the program module 210 may be implemented (e.g., executed) by, for example, the processor (e.g., the processor 210). At least some of the program module 210 may include, for example, a module, a program, a routine, a set of instructions, and/or a process for performing one or more functions.

Figure 3A:
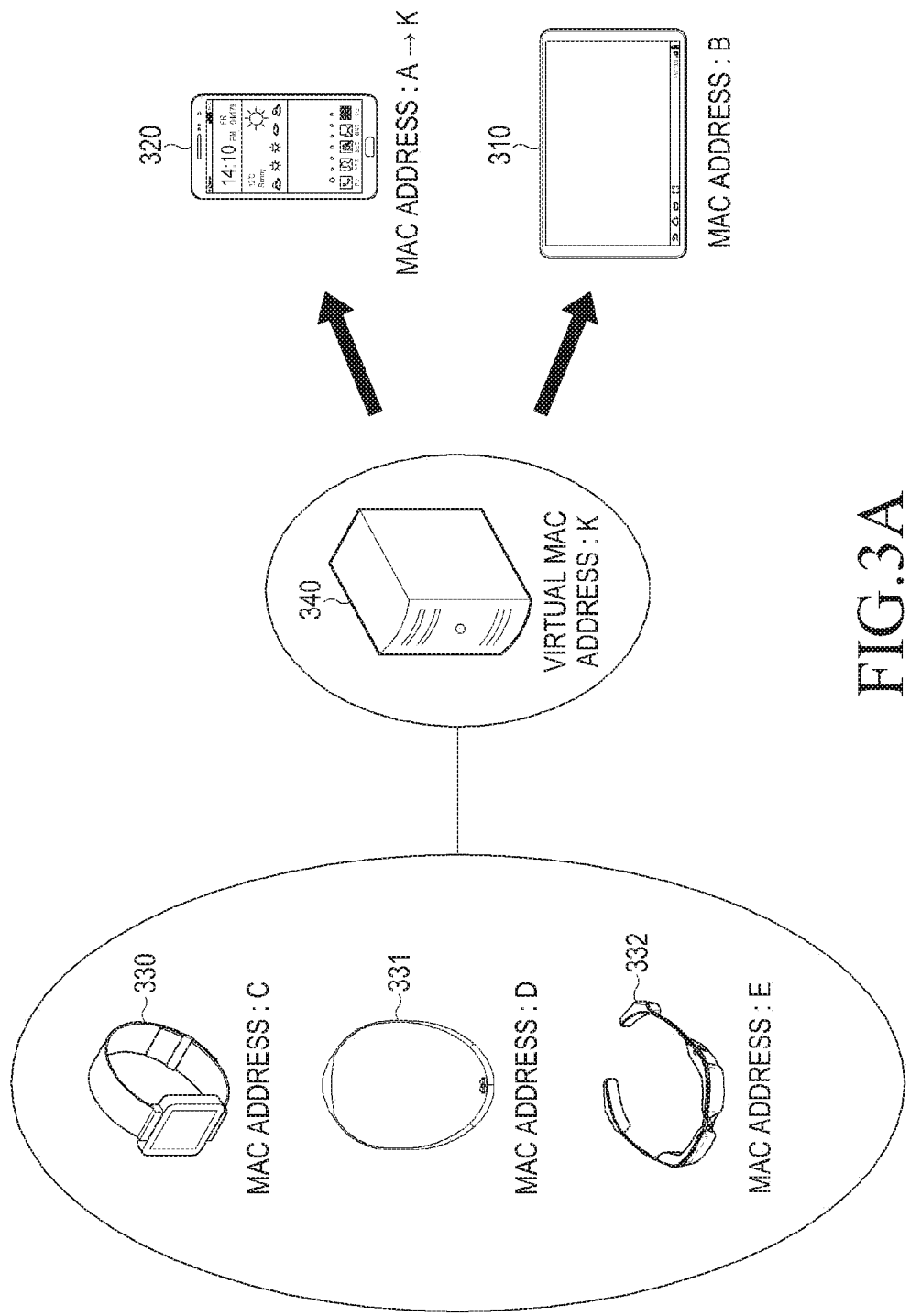
FIGS. 3A and 3B illustrate a method by which a first electronic device maintains a connection with a third electronic device on behalf of a second electronic device according to various embodiments of the present disclosure.
Figure 3B:
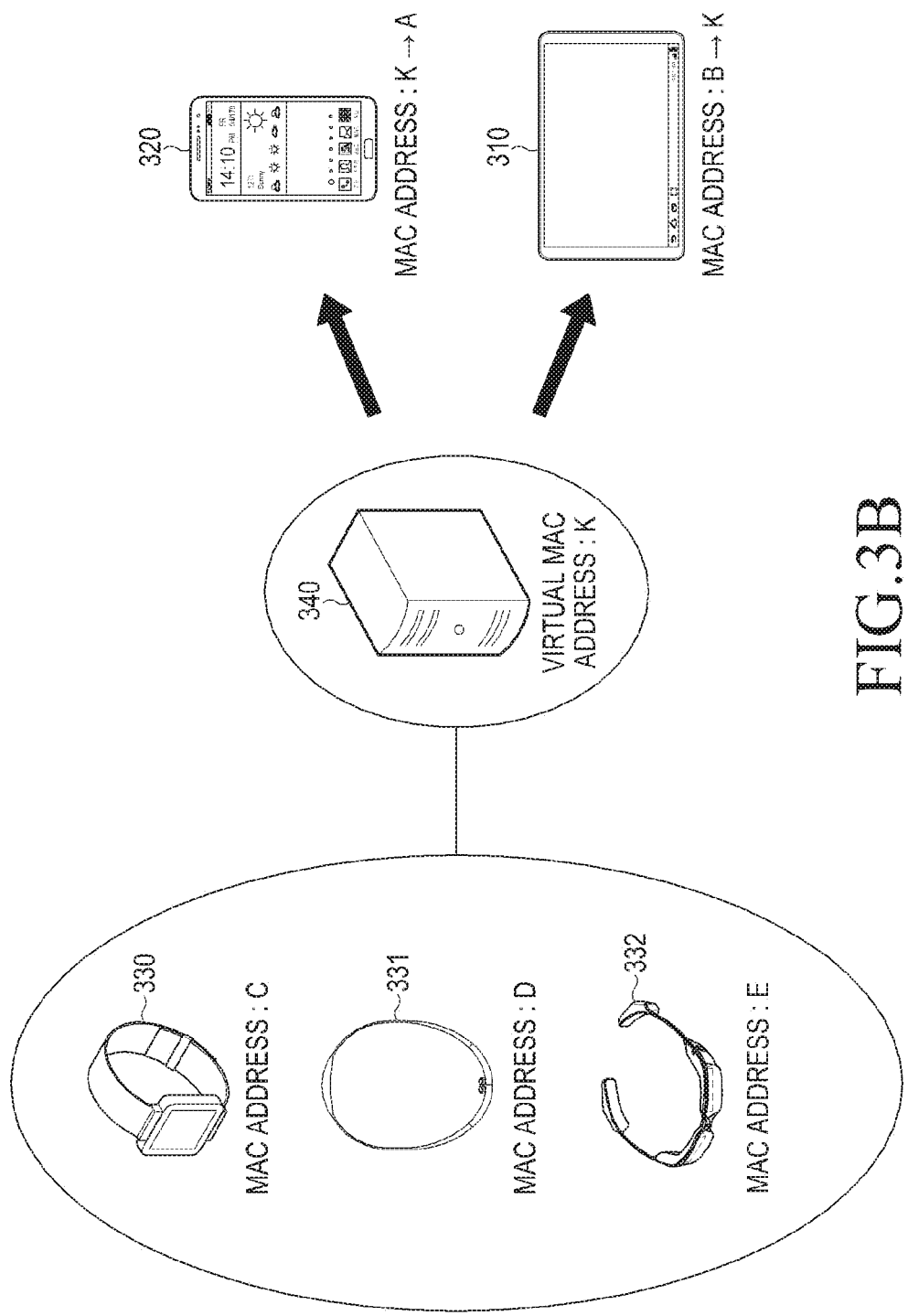

FIGS. 3A and 3B illustrate a method by which the first electronic device maintains a connection with a third electronic device on behalf of a second electronic device according to various embodiments of the present disclosure.

Figure 4:
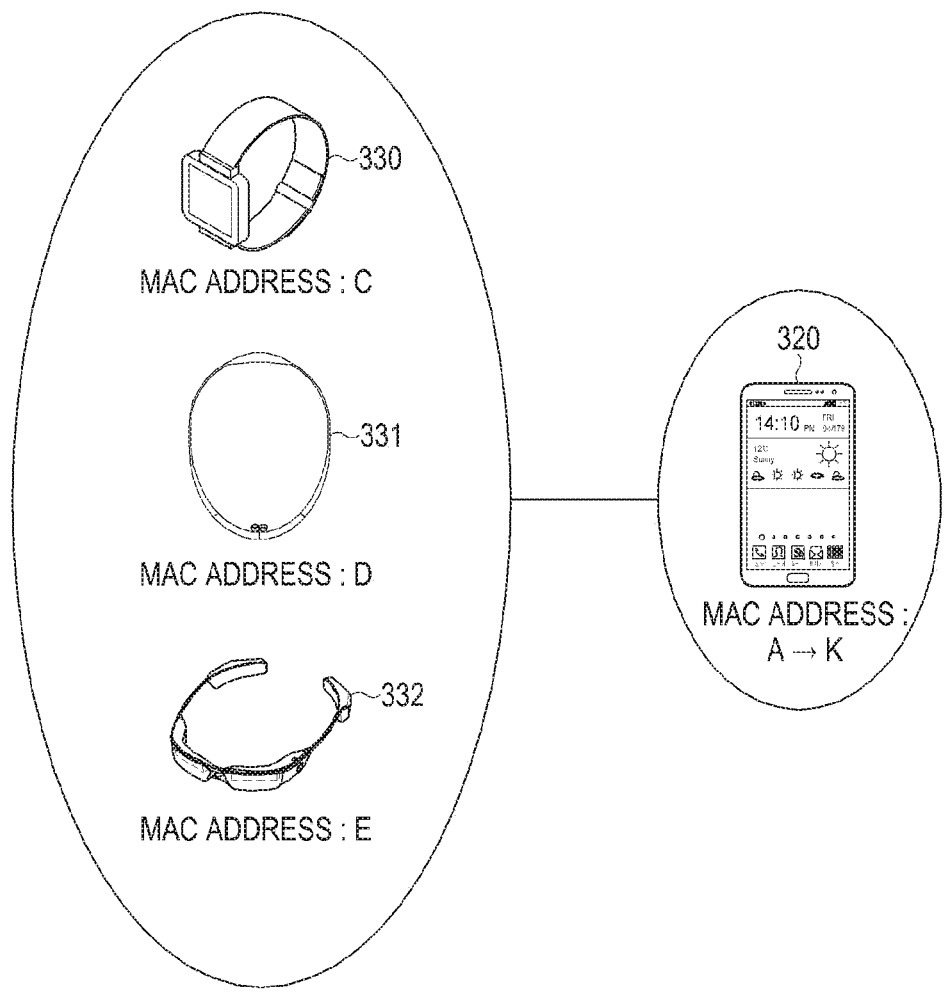
FIG. 4 illustrates a method of generating virtual device information and making a connection with one or more third electronic devices by the second electronic device according to various embodiments of the present disclosure.

FIGS. 3A, 3B, and 4 will be described based on virtual MAC information among virtual device information for convenience of the description. However, the present disclosure is not limited thereto.

FIG. 3A illustrates a method in which the second electronic device 320 acquires a virtual MAC address (K) from a server 340 and makes connections with a plurality of third electronic devices 330, 331, and 332 by using the acquired virtual MAC address (K). In FIG. 3A, it is assumed that the first electronic device 310, the second electronic device 320, and the plurality of third electronic devices 330, 331, and 332 exist within an area in which they may be connected through a Bluetooth scheme corresponding to one of short range wireless communication schemes and the first electronic device 310 is in an inactive state.

The second electronic device 320 may acquire the virtual MAC address (K) from the server 340 to make the connections with the plurality of third electronic devices 330, 331, and 332 through short range wireless communication.

The server 340 may generate and manage the virtual MAC address (K). The server 340 may transmit the virtual MAC address (K) associated with the second electronic device 320 to the second electronic device 320. The virtual MAC address (K) may be a virtual MAC address (K) assigned to the second electronic device 320 or a virtual MAC address (K) assigned to a user account associated with the second electronic device 320.

The second electronic device 320 may set the MAC address of the second electronic device 320 as the virtual MAC address (K) acquired from the server 340. For example, the second electronic device 320 may change the MAC address of the second electronic device 320 from a unique MAC address (A) of the second electronic device 320 to the virtual MAC address (K).

The second electronic device 320 may generate connection information based on the virtual MAC address (K) to make the connections with the plurality of third electronic devices 330, 331, and 332 through short range wireless communication. The second electronic device 320 may make the connections with the plurality of third electronic devices 330, 331, and 332 through the short range wireless communication by using the virtual MAC address (K) and the connection information.

For example, when the connections are made through a Bluetooth scheme, the second electronic device 320 may attempt the connections with the plurality of third electronic devices 330, 331, and 332 by using MAC addresses (C, D, and E) of the plurality of third electronic devices 330, 331, and 332, and the virtual MAC address (K). Thereafter, the second electronic device 320 may perform an authentication process or generate a link key. The second electronic device 320 may generate connection information that contains information indicating that the authentication process has been performed or the link key is generated and transmit the generated connection information to the server 340. The second electronic device 320 may make the connections with the plurality of third electronic devices 330, 331, and 332 by using the virtual MAC address (K) and the connection information. As described above, the second electronic device 320 may make the connections with the plurality of third electronic devices 330, 331, and 332 through the short range wireless communication by using the virtual MAC address (K) rather than its own unique MAC address (A).

FIG. 3B illustrates a method in which the first electronic device 310 is activated and maintains the connections with the plurality of third electronic devices 330, 331, and 332 on behalf of the second electronic device 320.

The first electronic device 310 may be activated and acquire a virtual MAC address and connection information generated based on the virtual MAC address from the server 340 or the second electronic device 320. The activation of the first electronic device 310 may refer to switching of the first electronic device 310 to a use mode. For example, the activation of the first electronic device 310 may refer to turning-on of power of the first electronic device 310 or switching of the first electronic device 310 from an idle mode to use mode.

Further, when the first electronic device 310 moves within an area in which the connection is possible through the Bluetooth scheme from an area in which the connection is not possible, the first electronic device 310 may acquire the virtual MAC address and the connection information from the server 340 or the second electronic device 320.

The activation of the first electronic device 310 may be identified by the second electronic device 320 or the server 340. When the activation of the first electronic device 310 is identified by the second electronic device 320, the second electronic device 320 may directly transmit the virtual MAC address and the connection information to the electronic device 310 or may make a request for transmitting the virtual MAC address and the connection information to the first electronic device 310 to the server. When the activation of the first electronic device 310 is identified by the server 340, the server 340 may transmit the virtual MAC address and the connection information to the first electronic device 310. Further, the server 340 may make a request for transmitting the virtual MAC address and the connection information to the first electronic device 310 to the second electronic device 320.

In addition, the server 340 and the second electronic device 320 may identify whether communication using the virtual MAC address and the connection information is supported after the first electronic device 310 is activated. The server 340 and the second electronic device 320 may determine whether to transmit the virtual MAC address and the connection information according to the identification of whether the communication is supported by the first electronic device 310. Further, the server 340 and the second electronic device 320 may identify a capability of the first electronic device 310, adjust the virtual MAC address and/or the connection information to correspond to the capability of the first electronic device 310, and transmit the adjusted virtual MAC address and/or connection information.

When the virtual MAC address and the connection information are transmitted to the first electronic device 310, the second electronic device 320 may set the MAC address of the second electronic device as the unique MAC address (A) of the second electronic device. For example, the second electronic device 320 may return the MAC address of the second electronic device, which has been changed to the virtual MAC address (K) of the second electronic device 320, to the unique MAC address (A) of the second electronic device. Further, the second electronic device 320 may release the connections with the plurality of electronic devices 330, 331, and 332.

The first electronic device 310 may set the MAC address of the first electronic device as the acquired virtual MAC address (K). For example, the first electronic device 310 may change the MAC address of the first electronic device from a unique MAC address (B) of the first electronic device to the virtual MAC address (K).

The first electronic device 310 may make the connections with the plurality of third electronic devices 330, 331, and 332 by using the virtual MAC address and the connection information. Since the first electronic device 310 has acquired the connection information, the first electronic device 310 does not need to additionally generate connection information for the connections with the plurality of electronic devices 330, 331; and 332. The connection information is generated based on the virtual MAC address (K) and the MAC address of the first electronic device 310 is changed to the virtual MAC address (K), so that the first electronic device 310 may make the connections with the plurality of electronic devices 330, 331, and 332 through short range wireless communication without the additional generation of the connection information.

As described above, since the virtual MAC address (K) and the connection information generated based on the virtual MAC address (K) are transmitted to the first electronic device 310 from the second electronic device 320, the first electronic device 310 may maintain the connections with the plurality of electronic devices 330, 331, and 332 on behalf of the second electronic device 320.

FIG. 4 illustrates a method of generating virtual device information and making a connection with one or more third electronic devices by the second electronic device according to various embodiments of the present disclosure.

The second electronic device 320 may directly generate a virtual MAC address (K). For example, the second electronic device 320 may generate the virtual MAC address (K) by using a unique MAC address (A) of the second electronic device. For example, the second electronic device 320 may generate the virtual MAC address (K) by using the unique MAC address (A) and a preset number of masking bits. The second electronic device 320 may generate the virtual MAC address (K) by applying a MAC address masking function to the unique MAC address (A) according to the preset number of masking bits.

Hereinafter, a method of generating the virtual MAC address (K) based on an assumption that the unique MAC address (A) is 00:00:f0:8f:1e:80 will be described. When the number of masking bits is configured as one, for example, the last one bit (least significant bit) of the unique MAC address (A), the virtual MAC address, which may be generated by the second electronic device 320, may be 00:00:f0:8f:1e:80, and 00:00:f0:8f:1 e:81. Accordingly, in this case, the newly generated virtual MAC address (K) may be 00:00:f0:8f: 1 e:81.

Further, when the number of masking bits is configured as two, for example, last two bits (2 least significant bits) of the unique MAC address (A), the virtual MAC address, which may be generated by the second electronic device 320, may be 00:00:f0:8f:1e:80, 00:00:f0:8f:1e:81, 00:00:f0:8f:1e:82, and 00:00:f0:8f:1e:83. Accordingly, in this case, the newly generated virtual MAC address (K) may be one of 00:00: f0:8f:1 e:81, 00:00:f0:8f:1e:82, and 00:00:f0:8f:1e:83.

As described above, the second electronic device 320 may generate the virtual MAC address (K) by using its own unique MAC address (A). However, a method of generating the virtual MAC address (K) is only an example for the purpose of description and the present disclosure is not limited thereto. It is apparent to those skilled in the art that various methods of generating the virtual MAC address may be applied to the present disclosure.

The second electronic device 320 may set the MAC address of the second electronic device as the generated virtual MAC address (K). For example, the second electronic device 320 may change the MAC address of the second electronic device from a unique MAC address (A) of the second electronic device to the virtual MAC address (K).

The second electronic device 320 may generate connection information based on the virtual MAC address (K) to make the connections with the plurality of third electronic devices 330, 331, and 332 through short range wireless communication. The second electronic device 320 may make the connections with the plurality of third electronic devices 330, 331, and 332 through the short range wireless communication by using the virtual MAC address (K) and the connection information.

As described above, the second electronic device 320 may make the connections with the plurality of third electronic devices 330, 331, and 332 through the short range wireless communication by using the directly generated virtual MAC address (K) rather than its own unique MAC address (A).

Figure 5:
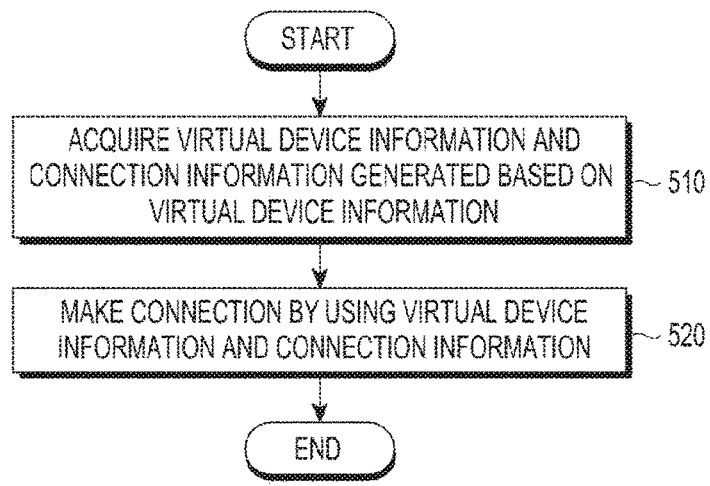
FIG. 5 is a flowchart illustrating a method of making a connection with one or more third electronic devices by the first electronic device according to various embodiments of the present disclosure.

FIG. 5 is a flowchart illustrating a method of making a connection with one or more third electronic devices by the first electronic device according to various embodiments of the present disclosure.

In step 510, the first electronic device acquires virtual device information associated with the second electronic device and connection information between the second electronic device and one or more third electronic devices, which is generated based on the generated virtual device information. The first electronic device may make the same type of connection with the One or more third electronic devices as the connection between the second electronic device and the one or more third electronic devices by using the virtual device information and the connection information.

The first electronic device may acquire the virtual device information and the connection information even though a communication module for performing communication (for example, Wi-Fi, Bluetooth, or the like) using the virtual device information and the connection information is deactivated. The first electronic device may activate the communication module by acquiring the virtual device information and the connection information.

In step 520, the first electronic device makes the connection with the one or more third electronic devices through short range wireless communication by using the virtual device information and the connection information. As the first electronic device uses the virtual device information and the connection information, the first electronic device may not have an additional operation required for the connection with each of the one or more third electronic devices. As described above, the first electronic device may maintain the connection with the one or more third electronic devices on behalf of the second electronic device.

Figure 6:
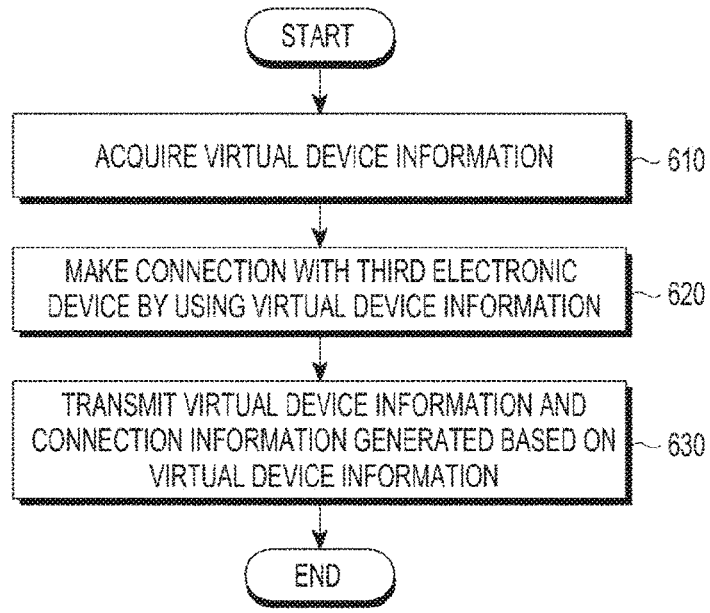
FIG. 6 is a flowchart illustrating a method of making the connection with the one or more third electronic devices by the second electronic device according to various embodiments of the present disclosure.

FIG. 6 is a flowchart illustrating a method of making the connection with the one or more third electronic devices by the second electronic device according to various embodiments of the present disclosure.

In step 610, the second electronic device acquires virtual device information associated with the second electronic device. The second electronic device may directly generate the virtual device information or acquire the virtual device information from an external server that manages the virtual device information.

The virtual device information may be assigned to the second electronic device or assigned to a user account associated with the electronic device. Further, the virtual device information may be stored in the server to correspond to the user account.

Accordingly, the virtual device information associated with the second electronic device may be virtual device information directly generated by the second electronic device, virtual device information assigned to the second electronic device, virtual device information assigned to the user account associated with or corresponding to the second electronic device, and the like.

In step 620, the second electronic device makes the connection with the one or more third electronic devices through short range wireless communication by using the virtual device information. The second electronic device may generate connection information during a process of making the connection with the one or more third electronic devices through short range wireless communication based on the virtual device information.

As described above, the connection information may be generated based on the virtual device information. The connection information may be information used in the process in which the second electronic device makes the connection with the one or more third electronic devices through the short range wireless communication, and the same type or scheme of connection as that between the second electronic device and the one or more third electronic devices may be performed by another electronic device based on the virtual device information and the connection information.

In step 630, the second electronic device transmits the virtual device information and the connection information between the second electronic device and the one or more third electronic devices to the first electronic device.

The second electronic device may identify the first electronic device. The second electronic device may identify whether the first electronic device transitions to a state where the first electronic device may be connected to the one or more third electronic devices. For example, the second electronic device may identify whether the first electronic device transitions to the state where the first electronic device may be connected to the one or more third electronic devices by identifying whether the first electronic device approaches an area in which the connection through the short range communication is possible and whether the first electronic device is activated (the electronic device is turned on or an idle mode is released) in the area in which the connection through the short range communication is possible.

When the first electronic device is identified, the second electronic device may transmit the virtual device information and the connection information to the first electronic device. The second electronic device may transmit the virtual device information and the connection information to the first electronic device directly or through the server. Further, the second electronic device may make a request for transmitting the virtual device information and the connection information to the server that manages the virtual device information and the connection information.

When the first electronic device does not have a capability to perform communication using the virtual device information and the connection information, the second electronic device may not transmit the virtual device information and the connection information to the first electronic device. Further, the second electronic device may identify the capability of the first electronic device, adjust the virtual device information and the connection information to correspond to the capability of the first electronic device based on the capability of the first electronic device, and transmit the adjusted virtual device information and connection information.

The first electronic device may acquire the virtual device information and the connection information and make the connection with the one or more third electronic devices by using the virtual device information and the connection information.

Figure 7:
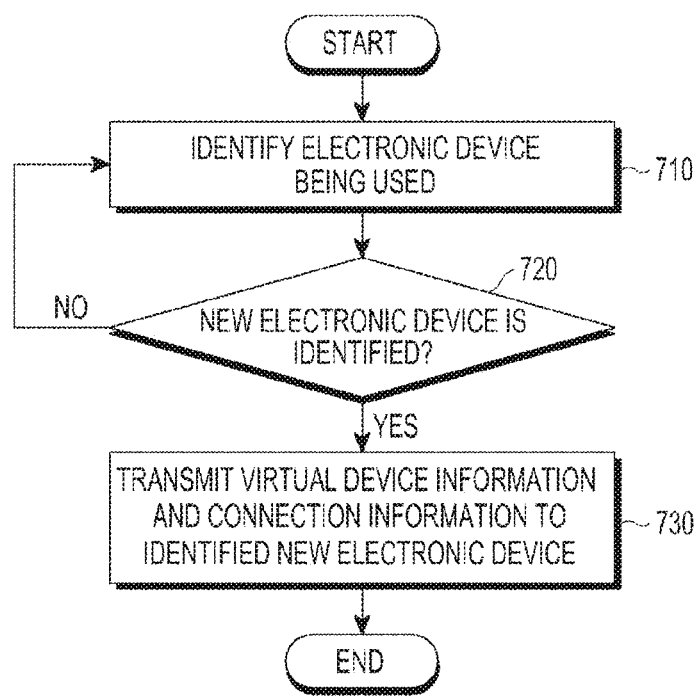
FIG. 7 is a flowchart illustrating a method of identifying the electronic device to which virtual device information and connection information are transmitted according to various embodiments of the present disclosure.

FIG. 7 is a flowchart illustrating a method of identifying the electronic device to which virtual device information and connection information are transmitted according to various embodiments of the present disclosure.

In step 710, the first electronic device identifies an electronic device, which is being used in an area where the connection is possible through short range wireless communication. The first electronic device may continuously identify electronic devices, which are being used in the connectable state in the area in which the connection through the short range wireless communication is possible.

For example, the first electronic device may identify whether a new electronic device approaches the area in which the connection through the short range wireless communication is possible or whether the new electronic device is activated (power is turned on or an idle mode is released) in the area in which the connection through the short range wireless communication is possible, so as to identify whether the new electronic device transitions to a use mode within the area. Further, the first electronic device may identify whether the existing electronic device, which has been identified as being used, is still in the use mode within the area.

In step 720, the first electronic device determines whether the new electronic device, which is being used, is identified. When the new electronic device is not identified, the first electronic device returns to step 710 and identifies again an electronic device, which is being used.

When the new electronic device is identified, the first electronic device transmits virtual device information and connection information to the identified new electronic device in step 730. The first electronic device may transmit the virtual device information and the connection information to the new electronic device such that the new electronic device may make a connection with another electronic device within the area without an individual additional operation for the connection.

Further, the first electronic device may release the connection with the electronic device, which leaves the area or is deactivated, among the existing electronic devices, which are identified as being used.

Figure 8A:
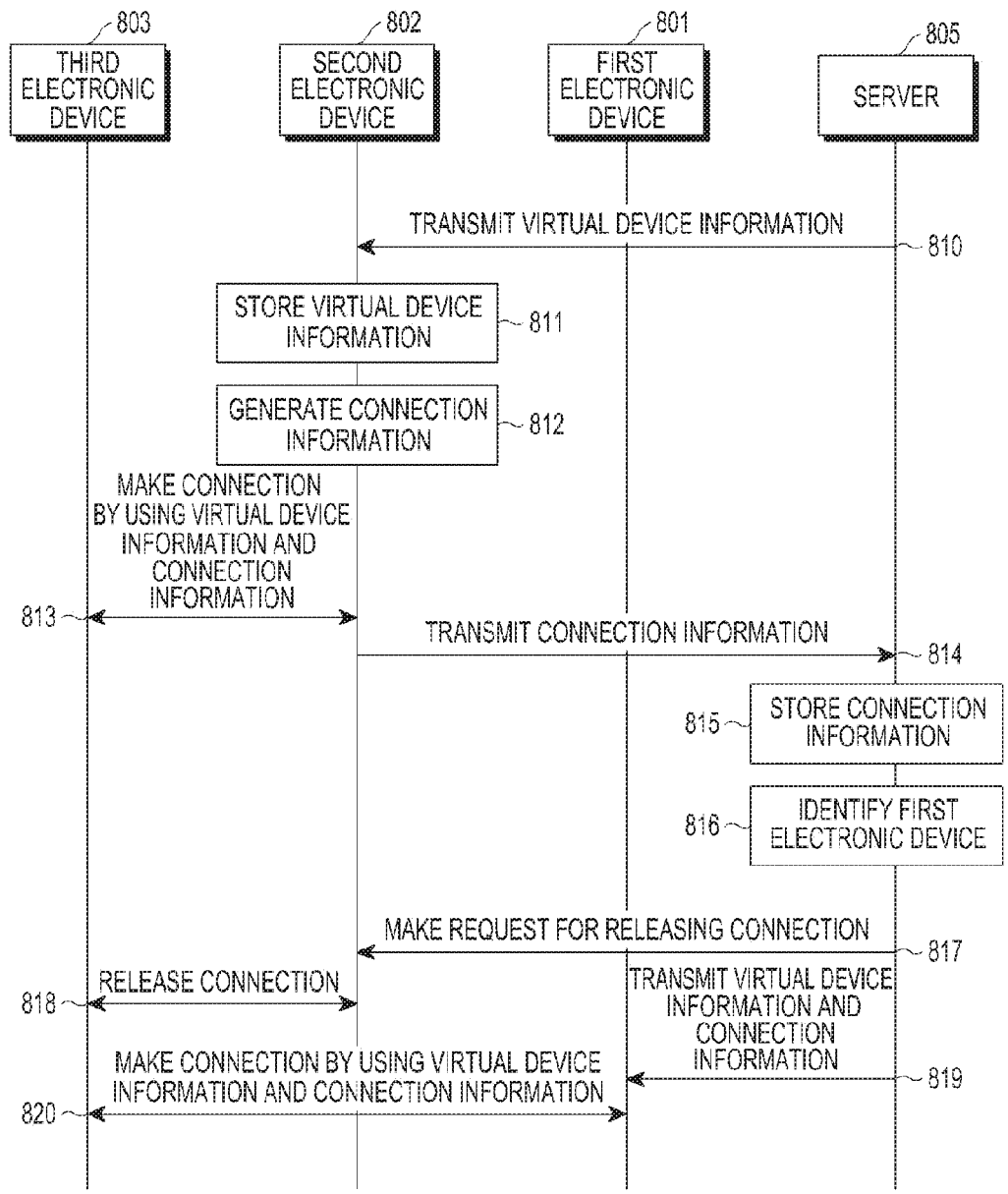
FIGS. 8A to 8C are flow diagrams illustrating a method by which the first electronic device maintains the connection with the third electronic device on behalf of the second electronic device according to various embodiments of the present disclosure.
Figure 8B:
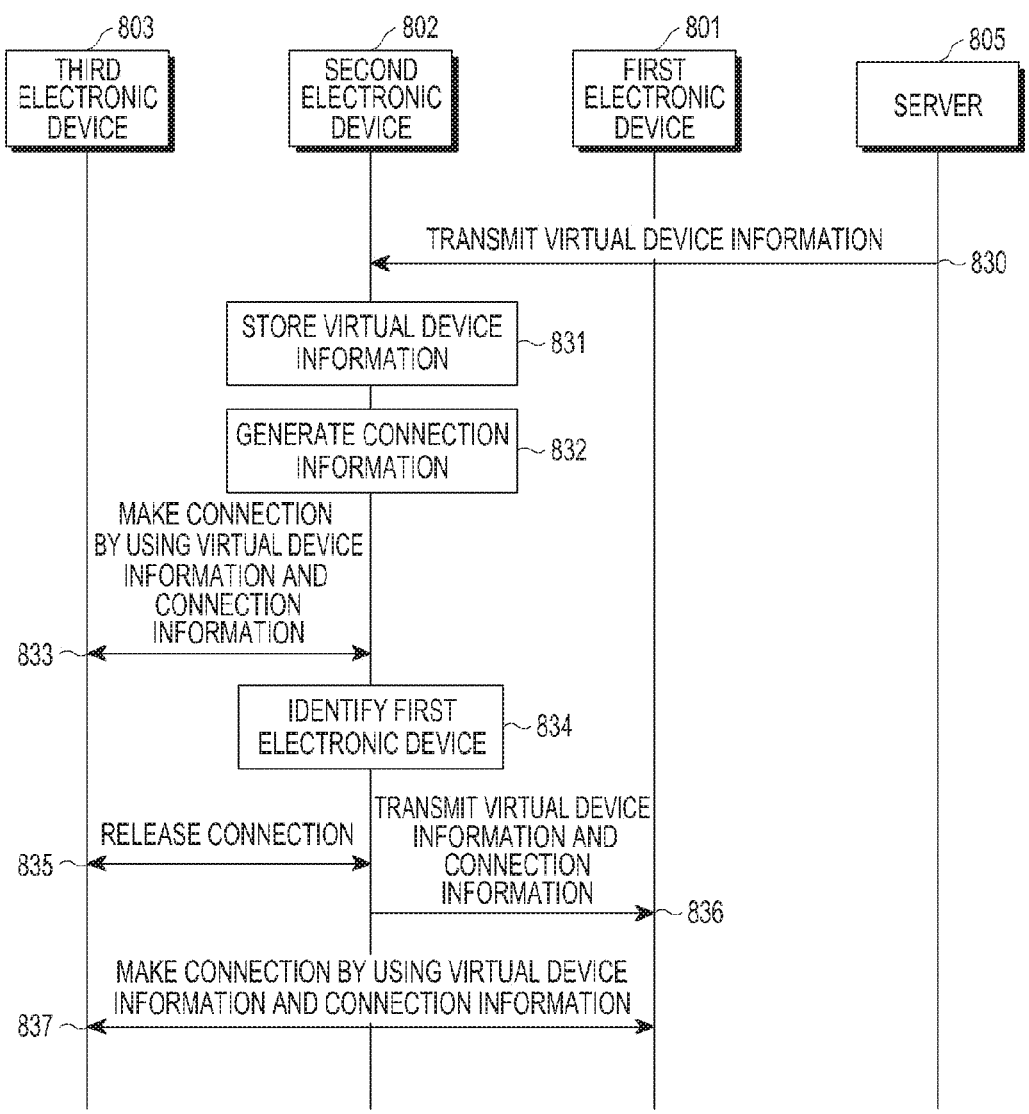
Figure 8C:
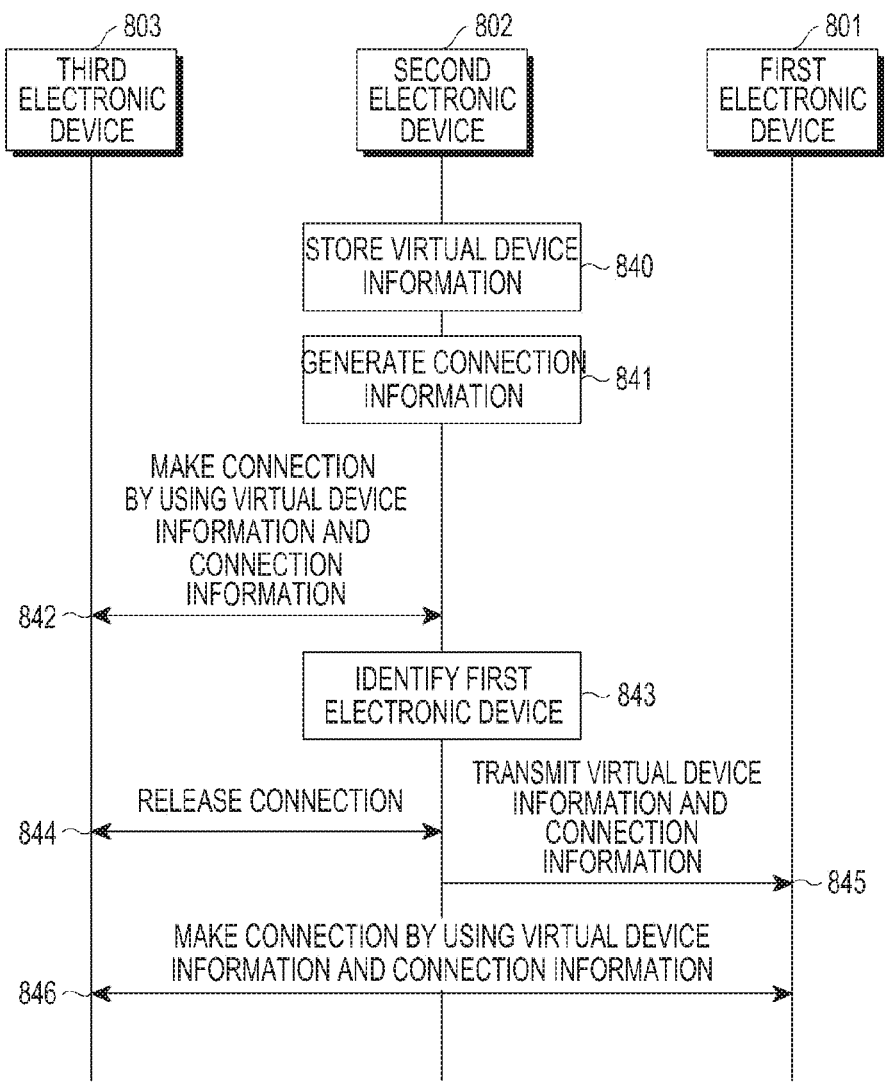

FIGS. 8A to 8C are flow diagrams illustrating a method by which a first electronic device maintains a connection with a third electronic device on behalf of a second electronic device according to various embodiments of the present disclosure.

FIG. 8A illustrates a method by which a first electronic device 801 maintains a connection with a third electronic device 803 through a server 805 on behalf of a second electronic device 802.

In step 810, the server 805 transmits virtual device information to the second electronic device 802. The server 805 may generate or manage the virtual device information. When the second electronic device 802 enters a virtual device information use mode and makes a request for the virtual device information, the server 805 transmits the virtual device information to the second electronic device 802.

Further, when the second electronic device 802 approaches an area in which the connection through short range wireless communication is possible or when the use of the second electronic device 802 within the area is identified, the server 805 transmits the virtual device information to the second electronic device 802 even though there is no request for the virtual device information.

In step 811, the second electronic device 802 stores the acquired virtual device information. The second electronic device 802 may set device information of the second electronic device as the virtual device information. For example, the second electronic device 802 may change a MAC address of the second electronic device from a unique MAC address of the second electronic device to a virtual MAC address included in the virtual device information.

In step 812, the second electronic device 802 attempts the connection with the third electronic device 803 by using the virtual device information and generates connection information between the second electronic device 802 and the third electronic device 803 based on the virtual device information.

In step 813, the second electronic device 802 makes the connection with the third electronic device 803 by using the virtual device information and the connection information.

After the connection with the third electronic device 803, the second electronic device 802 transmits the connection information generated based on the virtual device information to the server 805 in step 814.

In step 815, the server 805 stores the received connection information to correspond to the virtual device information.

In step 816, the server 805 identifies the first electronic device 801. The server 805 may identify that the first electronic device 801 approaches an area in which the connection through short range wireless communication is possible or that the first electronic device 801 is activated and thus switches to a use mode.

When the first electronic device 801 is identified, the server 805 makes a request for releasing the connection with the third electronic device 803 to the second electronic device 802 in step 817.

In step 818, the second electronic device 802 releases the connection with the third electronic device 803 in response to the request for releasing the connection. Further, the second electronic device 802 may set the device information of the second electronic device as unique device information of the second electronic device. For example, the second electronic device 802 may change the device information of the second electronic device, which has been changed to the virtual device information, to return to the unique device information of the second electronic device.

In step 819, the server 805 transmits the virtual device information and the connection information to the first electronic device 801. The server 805 may receive the connection information from the second electronic device 802 and store the received connection information to correspond to the virtual device information and, accordingly, may transmit the virtual device information and the connection information together to the first electronic device 801.

In step 820, the first electronic device 801 makes the connection with the third electronic device 803 by using the virtual device information and the connection information. The first electronic device 801 may set device information of the first electronic device as the virtual device information. Accordingly, unlike the generation of the connection information by the second electronic device 802 in the process for the connection with the third electronic device 803, the first electronic device 801 may make the connection with the third electronic device 803 by using the virtual device information and the acquired connection information acquired without a separate connection information generation operation.

FIG. 8B also illustrates the method by which the first electronic device 801 maintains the connection with the third electronic device 803 through the server 805 on behalf of the second electronic device 802. However, unlike FIG. 8A, the second electronic device 802 identifies the first electronic device 801 and directly transmits the virtual device information and the connection information to the first electronic device in FIG. 8B.

In step 830, the server 805 transmits the virtual device information to the second electronic device 802. When the second electronic device 802 enters a virtual device information use mode and makes a request for the virtual device information, the server 805 may transmit the virtual device information to the second electronic device 802.

Further, when the second electronic device 802 approaches an area in which the connection through short range wireless communication is possible or when the use of the second electronic device 802 within the area is identified, the server 805 may transmit the virtual device information to the second electronic device 802 even though there is no request for the virtual device information.

In step 831, the second electronic device 802 stores the acquired virtual device information. The second electronic device 802 may set device information of the second electronic device as the virtual device information.

In step 832, the second electronic device 802 attempts the connection with the third electronic device 803 by using the virtual device information and generates connection information between the second electronic device 802 and the third electronic device 803 based on the virtual device information.

In step 833, the second electronic device 802 makes the connection with the third electronic device 803 by using the virtual device information and the connection information.

In step 834, the second electronic device 802 identifies the first electronic device 801. The second electronic device 802 may identify that the first electronic device 801 approaches an area in which the connection through short range wireless communication is possible or that the first electronic device 801 is activated and thus switches to a use mode.

When the first electronic device 801 is identified, the second electronic device 802 releases the connection with the third electronic device 803 in step 835. Further, the second electronic device 802 may set the device information of the second electronic device as unique device information of the second electronic device.

In step 836, the second electronic device 802 transmits the virtual device information and the connection information to the first electronic device 801.

In step 837, the first electronic device 801 makes the connection with the third electronic device 803 by using the virtual device information and the connection information. The first electronic device 801 may set device information of the first electronic device as the virtual device information. Accordingly, unlike the generation of the connection information by the second electronic device 802 in the process for the connection with the third electronic device 803, the first electronic device 801 may make the connection with the third electronic device 803 by using the virtual information and the acquired connection information acquired without a separate connection information generation operation.

FIG. 8C illustrates a method by which the first electronic device 801 maintains the connection with the third electronic device 803 without using the server 805 on behalf of the second electronic device 802.

In step 840, the second electronic device 802 generates virtual device information. For example, the second electronic device 802 may generate the virtual device information by using unique device information of the second electronic device 802. A detailed method of generating the virtual device information is the same as that described in FIG. 4.

In step 841, the second electronic device 802 attempts the connection with the third electronic device 803 by using the virtual device information and generate connection information between the second electronic device 802 and the third electronic device 803 based on the virtual device information.

In step 842, the second electronic device 802 makes the connection with the third electronic device 803 by using the virtual device information and the connection information.

In step 843, the second electronic device 802 identifies the first electronic device 801. The second electronic device 802 may identify that the first electronic device 801 approaches an area in which the connection through short range wireless communication is possible or that the first electronic device 801 is activated and thus switches to a use mode.

When the first electronic device 801 is identified, the second electronic device 802 releases the connection with the third electronic device 803 in step 844. Further, the second electronic device 802 may set the device information of the second electronic device as unique device information of the second electronic device.

In step 845, the second electronic device 802 transmits the virtual device information and the connection information to the first electronic device 801.

In step 846, the first electronic device 801 makes the connection with the third electronic device 803 by using the virtual device information and the connection information. The first electronic device 801 may set device information of the first electronic device as the virtual device information. Accordingly, unlike the generation of the connection information by the second electronic device 802 in the process for the connection with the third electronic device 803, the first electronic device 801 may make the connection with the third electronic device 803 by using the virtual device information and the acquired connection information acquired without a separate connection information generation operation.

As described above, the first electronic device 801 may maintain the connection with the third electronic device 803 without using the server 805 on behalf of the second electronic device 802.

A separate authentication process may be required for the transmission of the virtual device information and the connection information. For example, when user accounts associated with the first electronic device 801 and the second electronic device 802 are the same and the virtual device information is assigned to the user account, a separate authentication process may not be required. In contrast, when the connections of the first electronic device 801 and the second electronic device 802 do not correspond to account-based connections or manufacturers of the first electronic device 801 and the second electronic device 802 are different, a separate authentication process may be required for the transmission of the virtual device information and the connection information. In this case, the authentication may be performed through an installation of the same application or performed using the connection information. There is no limitation to the authentication method and various authentication methods that may be applied.

Figure 9A:
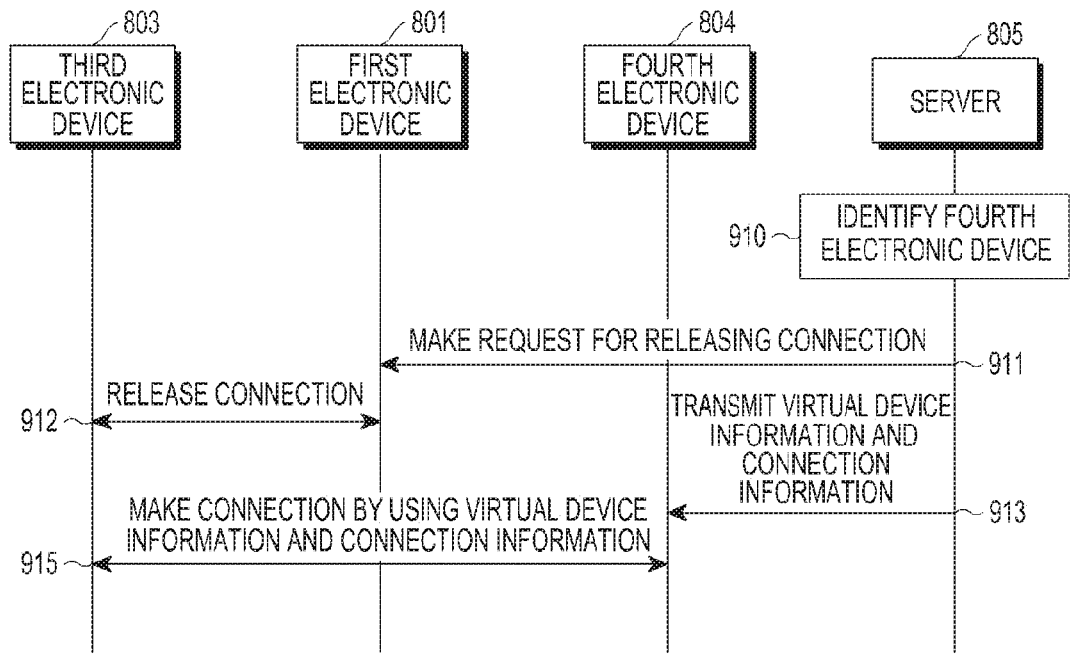
FIGS. 9A and 9B are flow diagrams illustrating a method by which a fourth electronic device maintains the connection with the third electronic device on behalf of the first electronic device according to various embodiments of the present disclosure.
Figure 9B:
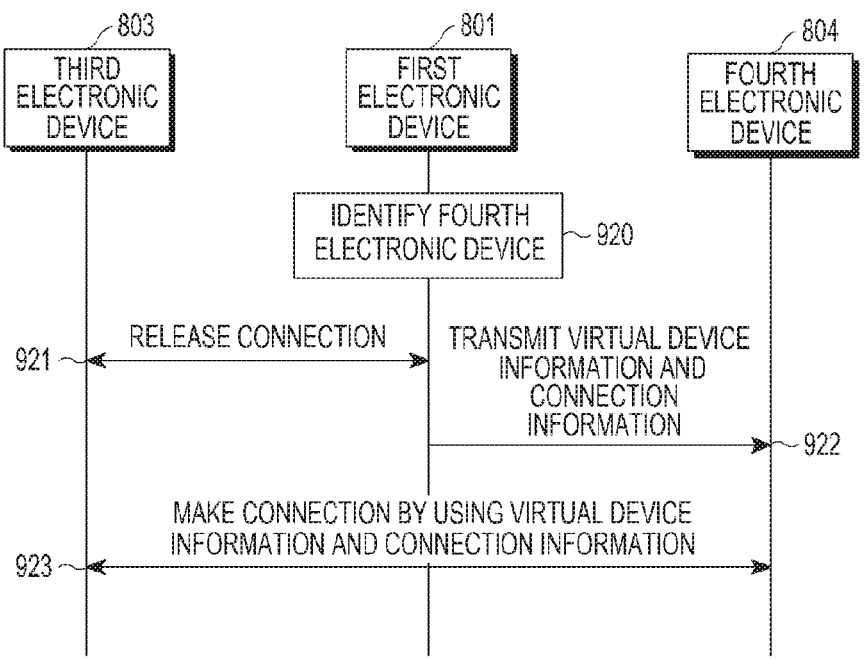

FIGS. 9A and 9B are flow diagrams illustrating a method by which a fourth electronic device maintains the connection with the third electronic device on behalf of the first electronic device according to various embodiments of the present disclosure.

FIGS. 9A and 9B illustrate a method by which the first electronic device 801 described in FIGS. 8A to 8C transmits the virtual device information and the connection information to a newly identified fourth electronic device 804 and the fourth electronic device 804 maintains the connection with the third electronic device 803 on behalf of the first electronic device 801.

FIG. 9A illustrates a method by which the fourth electronic device 804 maintains the connection with the third electronic device 803 through the server on behalf of the first electronic device 801.

In step 910, the server 805 identifies the fourth electronic device 804. The server 805 may identify that the fourth electronic device 804 approaches an area in which the connection through short range wireless communication is possible or that the fourth electronic device 804 is activated and thus switches to a use mode.

When the fourth electronic device 804 is identified, the server 805 makes a request for releasing the connection with the third electronic device 803 to the first electronic device 801 in step 911.

In step 912, the first electronic device 801 releases the connection with the third electronic device 803 in response to the request for releasing the connection. Further, the first electronic device 801 may set the device information of the first electronic device as unique device information of the first electronic device. For example, the first electronic device 801 may change the device information of the first electronic device, which has been changed to the virtual device information, to return to the unique device information of the first electronic device.

In step 913, the server 805 transmits the virtual device information and the connection information to the fourth electronic device 804. The server 805 may receive the connection information from the second electronic device 802 and store the received connection information to correspond to the virtual device information. Accordingly, the server 805 may transmit the virtual device information and the connection information together to the fourth electronic device 804.

In step 914, the fourth electronic device 804 makes the connection with the third electronic device 803 by using the virtual device information and the connection information. The fourth electronic device 804 may set device information of the first electronic device as the virtual device information. Accordingly, similar to the first electronic device 801, the fourth electronic device 804 may make the connection with the third electronic device 803 by using the virtual device information and the connection information acquired without a separate connection information generation operation.

FIG. 9B illustrates a method by which the fourth electronic device 804 maintains the connection with the third electronic device 803 without using the server on behalf of the first electronic device 801.

In step 920, the first electronic device 801 identifies the fourth electronic device 804. The first electronic device 801 may identify that the fourth electronic device 804 approaches an area in which the connection through short range wireless communication is possible or that the fourth electronic device 804 is activated and thus switches to a use mode.

When the fourth electronic device 804 is identified, the first electronic device 801 releases the connection with the third electronic device 803 in step 921. Further, the first electronic device 801 may set the device information of the first electronic device as unique device information of the first electronic device. For example, the first electronic device 801 may change the device information of the first electronic device, which has been changed to the virtual device information, to return to the unique device information of the first electronic device.

In step 922, the first electronic device 801 transmits the virtual device information and the connection information to the fourth electronic device 804.

In step 923, the fourth electronic device 804 makes the connection with the third electronic device 803 by using the virtual device information and the connection information. The fourth electronic device 804 may set device information of the first electronic device as the virtual device information. Accordingly, similar to the first electronic device 801, the fourth electronic device 804 may make the connection with the third electronic device 803 by using the virtual device information and the connection information acquired without a separate connection information generation operation.

When the fourth electronic device 804 is identified, the first electronic device, which maintains the connection with the third electronic device 803 may also transmit the virtual device information and the connection information to the fourth electronic device 804 on behalf of the second electronic device 802. Accordingly, the fourth electronic device 804 may maintain the connection with the third electronic device 803 on behalf of the first electronic device 801. As described above, even though the electronic device, which operates as the hub in the network in which a plurality of electronic devices communicate to each other, or the electronic device to be connected is changed, the connection between the second electronic device 802 and the third electronic device 803 may be continuously maintained in the same type and scheme between the electronic devices.

Figure 10A:
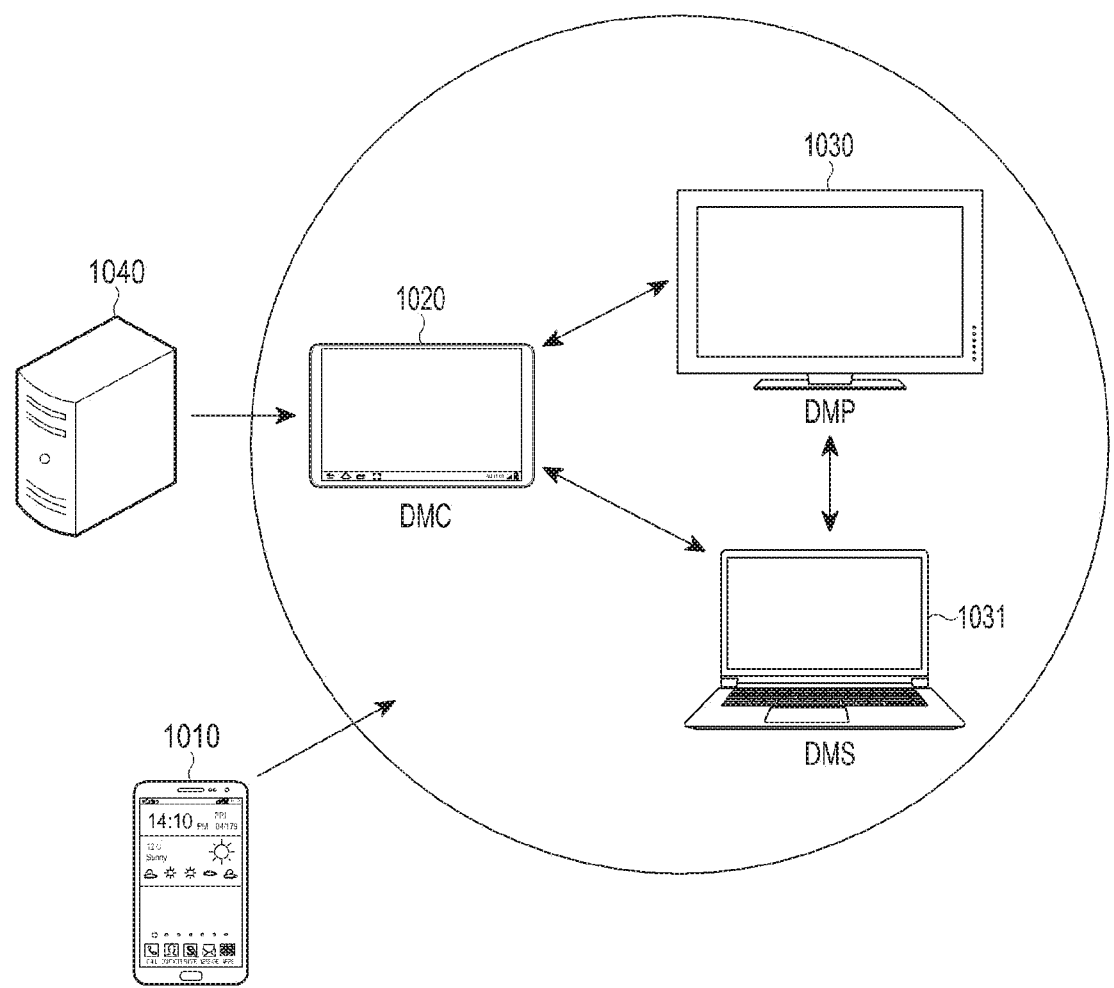
FIGS. 10A and 10B illustrate a method by which the first electronic device maintains the connection with one or more third electronic devices through a network on behalf of the second electronic device according to various embodiments of the present disclosure.
Figure 10B:
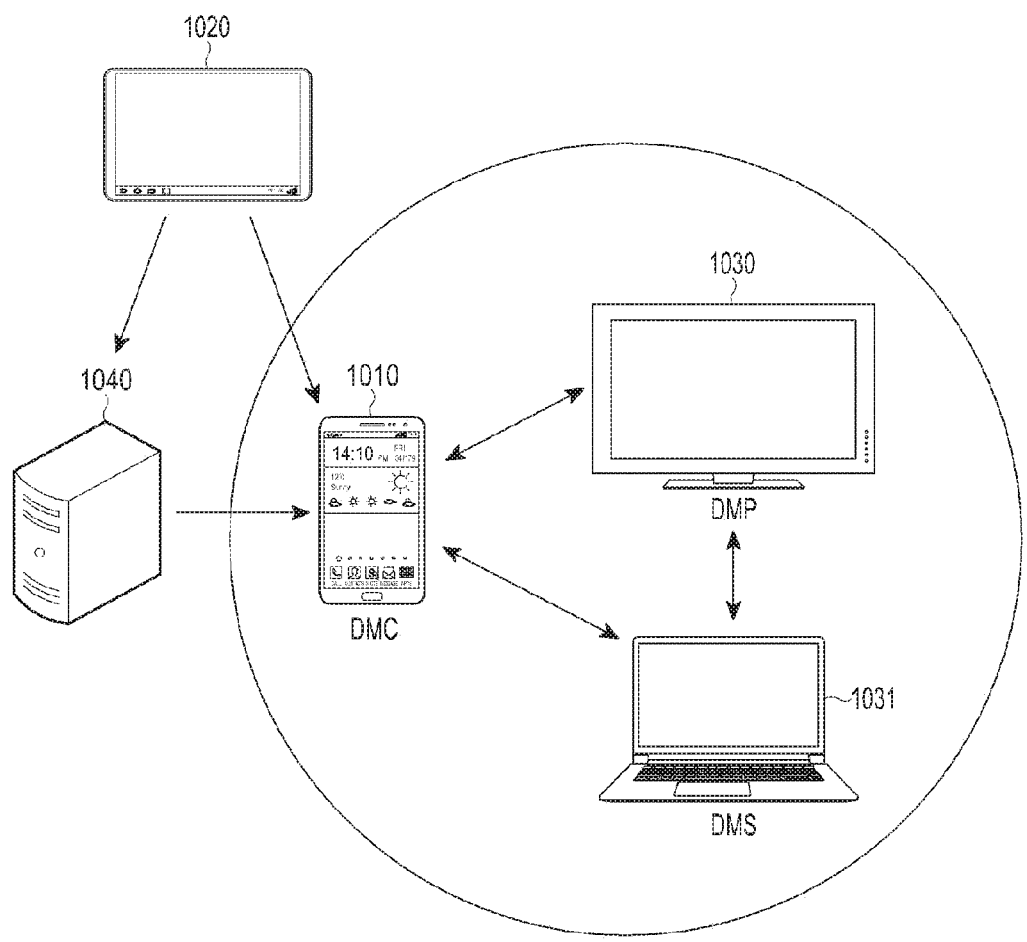

FIGS. 10A and 10B illustrate a method by which a first electronic device maintains a connection with one or more third electronic devices through a network on behalf of a second electronic device according to various embodiments of the present disclosure.

FIG. 10A illustrates a method by which a second electronic device 1020 makes connections with a plurality of third electronic devices 1030 and 1031 through the network.

The second electronic device 1020 may acquire virtual device information associated with the second electronic device from a server 1040. The server 1040 may generate or manage the virtual device information. The server 1040 may identify a request from the second electronic device 1020 or a use state of the second electronic device 1020 and transmit the virtual device information to the second electronic device 1020.

The second electronic device 1020 may set device information of the second electronic device 1020 as the virtual device information. For example, the second electronic device 1020 may change unique device information of the second electronic device 1020 to the virtual device information.

The second electronic device 1020 may configure the network with the plurality of third electronic devices 1030 and 1031 by using the virtual device information. In a process of configuring the network, the second electronic device 1020 may generate one or more pieces of profile information based on the virtual device information and capabilities of the second electronic device 1020 and the plurality of third electronic devices 1030. Each of the pieces of profile information may be information indicating roles of electronic devices included in the network, which the electronic devices play in the network. The profile information may be as shown as Table 1 below.

TABLE 1

| Device | Role | Contents |
| --- | --- | --- |
| Third electronic device 1030 | Digital media player (DMP) | Display and speaker |
| Third electronic device 1031 | Digital media server (DMS) | Media file |
| Second electronic device 1020 | Digital media controller (DMC) | Control app |

In Table 1, DMP, DMS, and DMC refer to roles of the second electronic device 1020, and the plurality of third electronic devices 1030 and 1031, respectively. In addition, roles of a digital media renderer (DMR) and a digital media printer (DMP) may be assigned according to the roles of the electronic devices.

Further, two or more roles may be assigned to each of the electronic devices according to the capability thereof as shown in Table 2.

TABLE 2

| Device | Role | Contents |
| --- | --- | --- |
| Third electronic device 1030 | Digital media server (DMS) | Media file |
| Third electronic device 1031 | Digital media player (DMP) | Display and speaker |
|  | Digital media controller (DMC) | Control app |

As shown in Table 2, the third electronic device 1030 may simultaneously play the roles of DMP and DMC.

As described above, the one or more pieces of profile information may be generated based on capabilities of the electronic devices included in the network, and connection information may be generated to correspond to each of the one or more pieces of profile information.

Further, when the electronic device included in the profile information is changed to another electronic device, when information indicating the role of the electronic device is updated, or when another electronic device is added, the profile information may be updated to match the changes. As described above, the update of the profile information may be performed by the server that manages the profile information or performed by the electronic device included in the current network according to the profile information. The electronic device may transmit the updated profile information to the server or directly transmit the updated profile information to the electronic device newly added to the network generated based on the profile information.

The second electronic device 1020 may configure the network by using the virtual device information and the connection information and make the connection with the plurality of third electronic devices 1030 and 1031 by using the network. The roles of the second electronic device 1020 and the plurality of third electronic devices 1030 and 1031 in the network may be determined according to the profile information corresponding to the connection information.

The second electronic device 1020 may transmit one or more pieces of generated profile information to the server 1040. The server 1040 may store the one or more pieces of profile information to correspond to the virtual device information.

The second electronic device 1020 may identify whether the first electronic device 1010 approaches an area in which the connection through the network is possible. The server 1040 may identify whether the first electronic device 1010 approaches the area in which the connection through the network is possible. A method by which the first electronic device 1010 maintains the connections with the plurality of third electronic devices 1030 and 1031 through the network on behalf of the second electronic device 1020 when the second electronic device 1020 or the server 1040 identifies the approach of the first electronic device 1010 will be described in FIG. 10B. Further, when the second electronic device 1020 identifies the approach of the first electronic device 1010, the second electronic device 1020 may set the device information of the second electronic device as unique device information of the second electronic device.

As illustrated in FIG. 10B, the first electronic device 1010 may enter the area in which the connection is possible through the network described in FIG. 10A. It is illustrated in FIG. 10B that the second electronic device 1020 leaves the area, however, the second electronic device 1020 may be continuously located within the area but may be deactivated within the area, so that all the connections with the plurality of third electronic devices 1030 and 1031 may be released. The second electronic device 1020 may make the connections with the plurality of third electronic devices 1030 and 1031 again by using its own unique device information in an activated state within the area.

When it is identified that the first electronic device 101 enters the area, the server 1040 or the second electronic device 1020 may identify the capability of the first electronic device 1010. The server 1040 or the second electronic device 1020 may transmit one or more pieces of profile information corresponding to the identified capability of the first electronic device or a list of the one or more pieces of profile information.

The first electronic device 1010 may display the received one or more pieces of profile information or the received list of the one or more pieces of profile information. The first electronic device 1010 may select one piece of profile information from the one or more pieces of profile information or the list of the one or more pieces of profile information based on a user's input. The first electronic device 1010 may transmit a signal indicating the selection of the profile information to the second electronic device 1020 or the server 1040.

The second electronic device 1020 or the server 1040 may transmit the virtual device information and connection information corresponding to the selected profile information to the first electronic device 1010 in response to the signal. Further, the second electronic device 1020 or the server 1040 may transmit all of one or more pieces of profile information generated in advance and the one or more pieces of profile information to the first electronic device 1010.

The first electronic device 1010 may make the connections with the plurality of third electronic devices 1030 and 1031 through the network by using the virtual device information and the connection information corresponding to the selected profile information. Accordingly, the first electronic device 1010 may maintain the connections with the plurality of third electronic devices 1030 and 1031 through the network on behalf of the second electronic device 1020.

Figure 11:
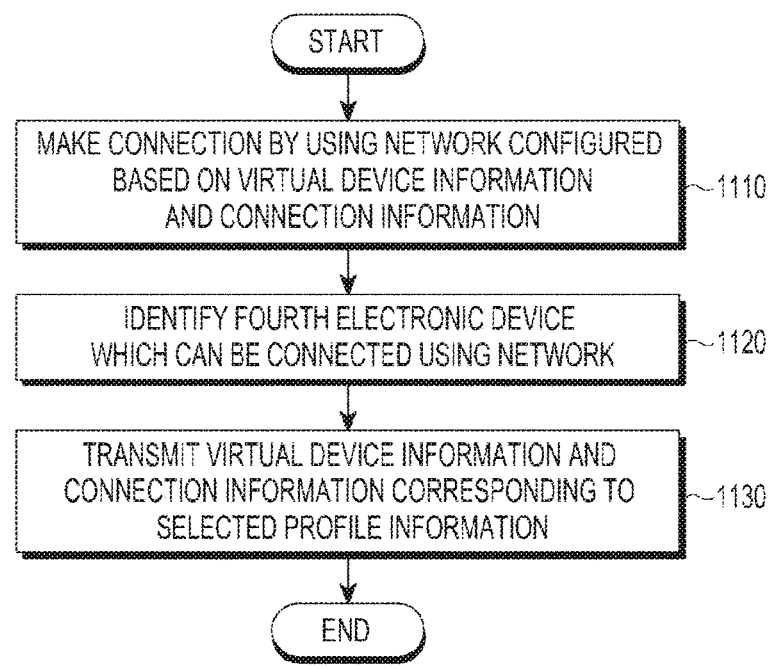
FIG. 11 is a flowchart illustrating a method by which the first electronic device makes the connection with one or more third electronic devices through the network according to various embodiments of the present disclosure.

FIG. 11 is a flowchart illustrating a method by which the first electronic device makes the connection with one or more third electronic devices through the network according to various embodiments of the present disclosure.

In step 1110, the first electronic device makes the connection with one or more third electronic devices through short range wireless communication by using the network configuration based on acquired virtual device information and connection information. The network may be configured according to the virtual device information and the connection information. Accordingly, the first electronic device may maintain the connection with the one or more third electronic devices by making the connection with the one or more third electronic devices through the network on behalf of the second electronic device.

In step 1120, the first electronic device identifies a fourth electronic device, which may be connected to the one or more third electronics device through the short range wireless communication by using the network. The first electronic device may continuously identify whether a new device approaches an area in which the connection is possible through the network or whether the electronic device within the area transitions to a use mode.

The first electronic device may transmit one or more pieces of profile information for a network configuration corresponding to a capability of the fourth electronic device or a list of the one or more pieces of profile information to the identified fourth electronic device.

In step 1130, the first electronic device transmits the virtual device information and connection information corresponding to the profile information selected by the fourth electronic device to the fourth electronic device. The first electronic device may transmit the virtual device information and the connection information to the fourth electronic device in response to a signal indicating the selection of the profile information from the fourth electronic device.

The first electronic device may transmit all pieces of connection information corresponding to one or more pieces of pre-generated profile information to the fourth electronic device. In this case, the fourth electronic device may select the virtual device information and connection information corresponding to the selected profile information among the received connection information and make the connection with the one or more third electronic devices.

Figure 12:
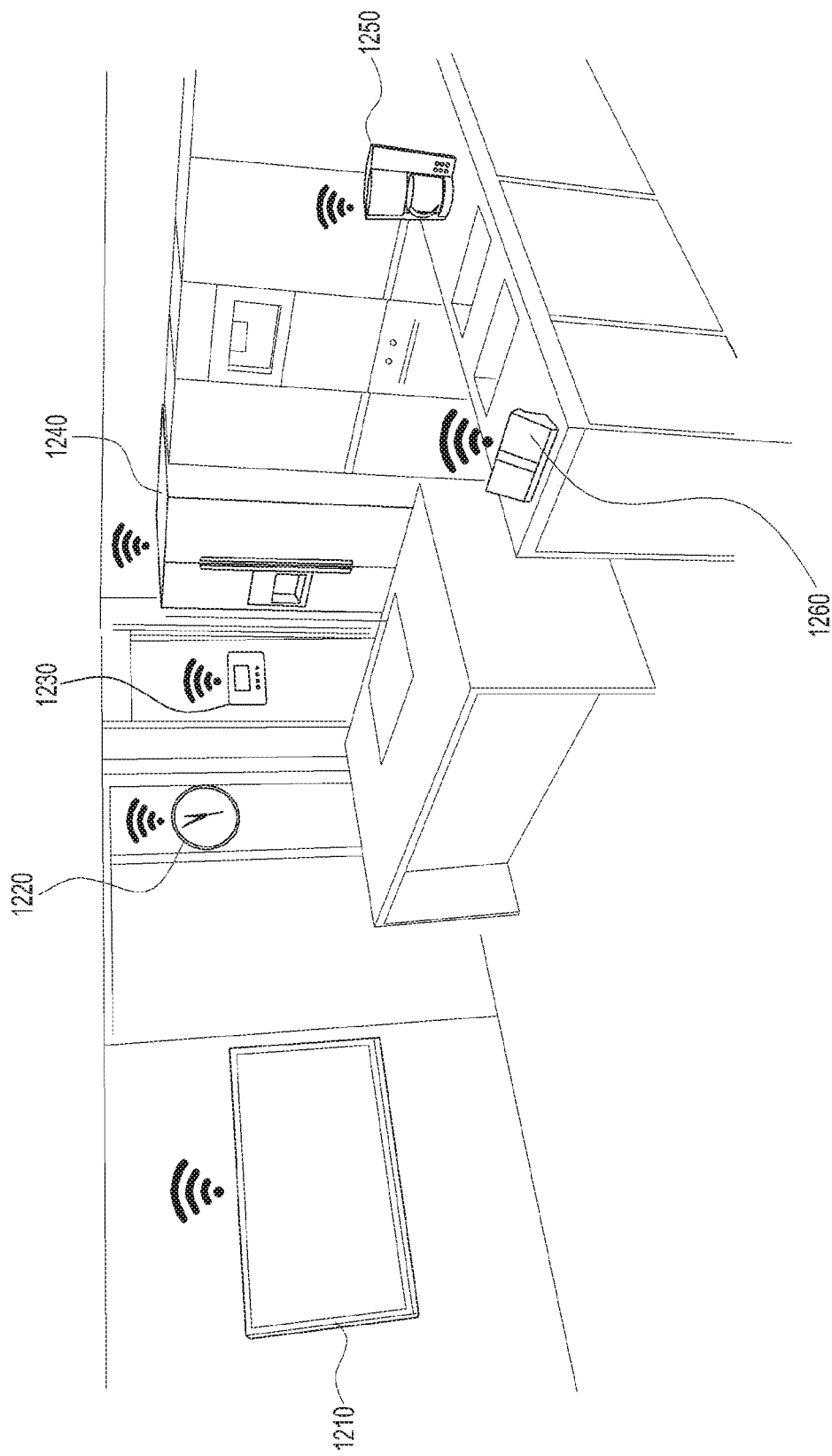
FIG. 12 illustrates a method of maintaining a connection between electronic devices in an Internet of things (JOT) environment according to various embodiments of the present disclosure.

FIG. 12 illustrates a method of maintaining a connection between electronic devices in an Internet of things (IOT) environment according to various embodiments of the present disclosure.

In the IOT environment, devices connected to each other through wireless communication may transmit/receive and process information. Further, in the IOT environment as illustrated in FIG. 12, electronic devices within a particular space may communicate with an external server through a second electronic device 1210 which may operate as an IOT hub. Hereinafter, a method by which the second electronic device 1210 makes connections with a plurality of third electronic devices 1220, 1230, 1240, 1250, and 1260, that exist within a particular space in the IOT environment, through short range wireless communication will be described.

The second electronic device 1210 may acquire virtual device information from an external server. The second electronic device 1210 may set device information of the second electronic device as the virtual device information.

The second electronic device 1210 may generate connection information based on the virtual device information to make the connections with the plurality of third electronic devices 1220, 1230, 1240, 1250, and 1260. A method by which the second electronic device 1210 generates the connection information is the same as that described above.

The second electronic device 1210 may make the connections with the plurality of third electronic devices 1220, 1230, 1240, 1250, and 1260 by using the virtual device information and the connection information. The second electronic device 1210 and the external server may store the virtual device information and the connection information to correspond to each other.

The second electronic device 1210 may operate as the IOT hub to make a connection with the external server and serve as a connection point between the plurality of third electronic devices 1220, 1230, 1240, 1250, and 1260. Accordingly, as described above, when the second electronic device 1210 has trouble or an error, or is replaced in a state where the IOT environment is established through the connections between the second electronic device 1210 and the plurality of third electronic devices 1220, 1230, 1240, 1250, and 1260, the connections between the plurality of third electronic devices 1220, 1230, 1240, 1250, and 1260 may be released.

The trouble, error, or replacement of the second electronic device 1210 may be identified by the external server or by each of the plurality of third electronic devices 1220, 1230, 1240, 1250, and 1260.

When the trouble, error, or replacement of the second electronic device 1210 is identified, one of the plurality of third electronic devices 1220, 1230, 1240, 1250, and 1260 may serve as the IOT hub on behalf of the second electronic device 1210. For example, it is assumed that the first electronic device 1230 among the plurality of third electronic devices 1220, 1230, 1240, 1250, and 1260 serves as the IOT hub on behalf of the second electronic device 1210.

The first electronic device 1230 may acquire the virtual device information and the connection information generated based on the virtual device information from the external server. The first electronic device 1230 may set device information of the first electronic device as the virtual device information and make the connections with the plurality of third electronic devices 1220, 1240, 1250, and 1260 by using the virtual device information and the connection information. Since the first electronic device 1230 has acquired the connection information from the external server, the first electronic device 1230 may make the connections with the plurality of third electronic devices 1220, 1240, 1250, and 1260 without a process for generating the connection information based on the virtual device information. As described above, the first electronic device 1230 may operate as the IOT hub on behalf of the second electronic device 1210 without any additional operation.

Figure 13:
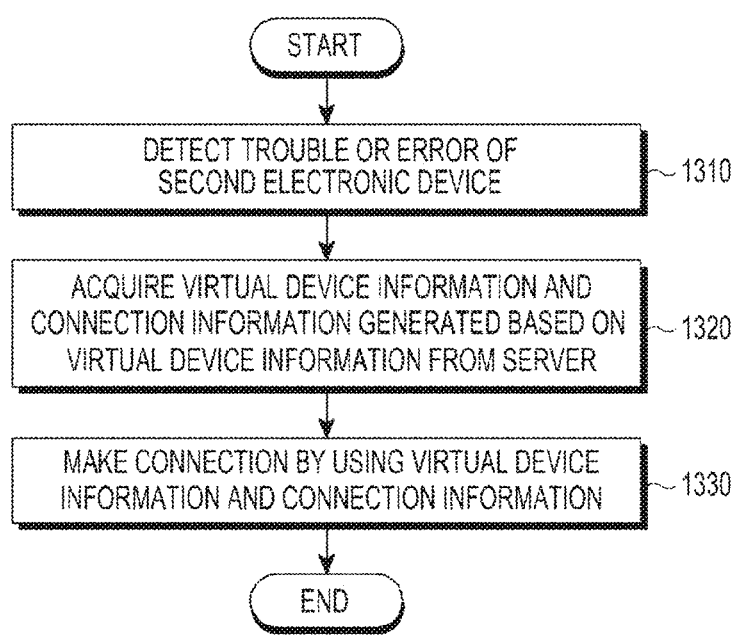
FIG. 13 is a flowchart illustrating a method of maintaining a connection between electronic devices in an IOT environment according to various embodiments of the present disclosure.

FIG. 13 is a flow diagram illustrating a method of maintaining a connection between electronic devices in an IOT environment according to various embodiments of the present disclosure.

In step 1310, the first electronic device detects trouble or an error of the second electronic device, which operates as an IOT hub in the IOT environment. The first electronic device may directly detect the trouble or error of the second electronic device or may detect it by receiving a signal indicating that the second electronic device has the trouble or error from an external server.

In step 1320, the first electronic device acquires the virtual device information and connection information generated based on the virtual device information from the server. The first electronic device 1230 may set device information of the first electronic device as the virtual device information.

In step 1330, the first electronic device makes connections with a plurality of third electronic devices within the IOT environment by using the virtual device information and the connection information. As described above, the first electronic device 1230 may operate as the IOT hub on behalf of the second electronic device 1210 without any additional operation.

Figure 14:
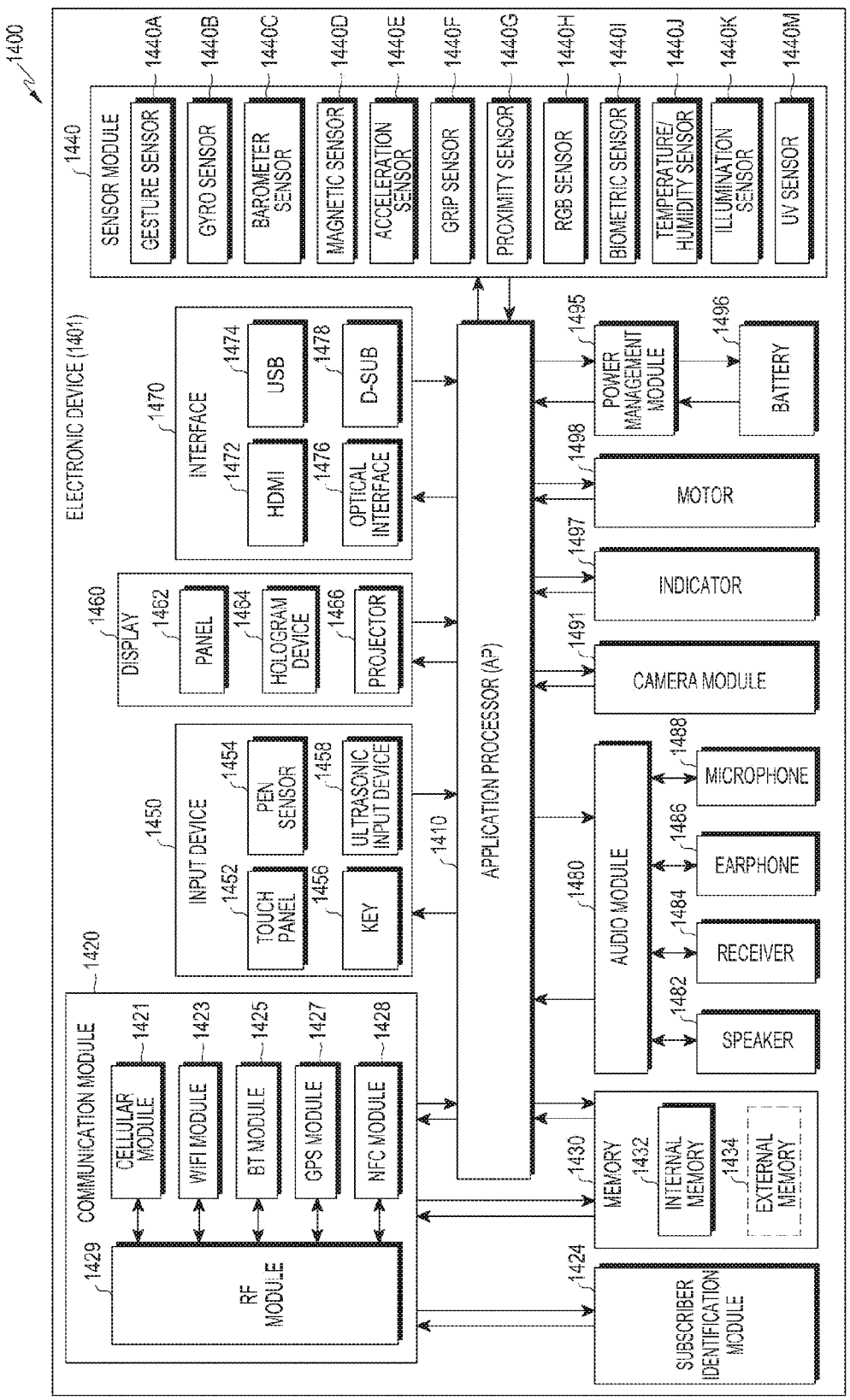
FIG. 14 is a block diagram of the electronic device according to various embodiments of the present disclosure.

FIG. 14 is a block diagram of an electronic device 1401 according to various embodiments of the present disclosure. The electronic device 1401 may include, for example, the entire or part of the electronic device 101 illustrated in FIG. 1. The electronic device 1401 includes at least one application processor (AP) 1410, a communication module 1420, a subscriber identification module 1424, a memory 1430, a sensor module 1440, an input device 1450, a display 1460, an interface 1470, an audio module 1480, a camera module 1491, a power management module 1495, a battery 1496, an indicator 1497, and a motor 1498.

The application processor 1410 may control a plurality of hardware or software elements connected to the application processor 1410 by driving an operating system or an application program and perform processing of various pieces of data and calculations. The application processor 1410 may be implemented by, for example, a System on Chip (SoC). According to an embodiment of the present disclosure, the application processor 1410 may further include a graphic processing unit (GPU) and/or an image signal processor. The application processor 1410 may include at least some (for example, a cellular module 1421) of the elements illustrated in FIG. 14. The application processor 1410 may load, into a volatile memory, instructions or data received from at least one (for example, a non-volatile memory) of the other elements and may process the loaded instructions or data, and may store various data in a non-volatile memory.

The communication module 1420 may have a configuration equal or similar to that of the communication interface 170 of FIG. 1. The communication module 1420 includes the cellular module 1421, a Wi-Fi module 1423, a Bluetooth (BT) module 1425, a GPS module 1427 (for example, a GPS module, a Glonass module, a Beidou module, or a Galileo module), an NFC module 1428, and a Radio Frequency (RF) module 1429.

The cellular module 1421 may provide a voice call, an image call, a text message service, or an Internet service through, for example, a communication network. According to an embodiment of the present disclosure, the cellular module 1421 may distinguish between and authenticate electronic devices 1401 within a communication network using a subscriber identification module 1424 (for example, a SIM card). The cellular module 1421 may perform at least some of the functions that the application processor 1410 may provide. The cellular module 1421 may include a communication Processor (CP).

The Wi-Fi module 1423, the Bluetooth module 1425, the GPS module 1427, or the NFC module 1428 may include, for example, a processor that processes data transmitted and received through the corresponding module. According to an embodiment of the present disclosure, at least some (for example, two or more) of the cellular module 1421, the Wi-Fi module 1423, the Bluetooth module 1425, the GPS module 1427, and the NFC module 1428 may be included in one integrated chip (IC) or IC package.

The RF module 1429 may transmit/receive, for example, a communication signal (for example, an RF signal). The RF module 1429 may include, for example, a transceiver, a power amp module (PAM), a frequency filter, a low noise amplifier (LNA), or an antenna. According to another embodiment of the present disclosure, at least one of the cellular module 1421, the Wi-Fi module 1423, the Bluetooth module 1425, the GPS module 1427, and the NFC module 1428 may transmit and receive RF signals through a separate RF module.

The subscriber identification module 1424 may include, for example, a SIM card including a subscriber identity module and/or an embedded subscriber identity module, and may contain unique identification information (for example, an integrated circuit card identifier (ICCID)) or subscriber information (for example, an international mobile subscriber identity (IMSI)).

The memory 1430 (for example, the memory 130) includes an internal memory 1432 or an external memory 1434. The internal memory 1432 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard drive, or a Solid State Drive (SSD).

The external memory 1434 may include a flash drive, for example, a Compact Flash (CF), a Secure Digital (SD), a Micro Secure Digital (Micro-SD); a Mini Secure Digital (Mini-SD), an eXtreme Digital (xD), a memory stick, and the like. The external memory 1434 may be functionally and/or physically connected to the electronic device 1401 through various interfaces.

The sensor module 1440 may measure a physical quantity or detect an operation state of the electronic device 1401, and may convert the measured or detected information into an electrical signal. The sensor module 1440 includes a gesture sensor 1440A, a gyro sensor 1440B, a barometer sensor 1440C, a magnetic sensor 1440D, an acceleration sensor 1440E, a grip sensor 1440F, a proximity sensor 1440G, an RGB sensor 1440H, a biometric sensor 1440I, a temperature/humidity sensor 1440J, an illumination sensor 1440K, and an ultraviolet (UV) sensor 1440M. Additionally or alternatively, the sensor module 1440 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling one or more sensors included therein. In some embodiments of the present disclosure, an electronic device 1401 may further include a processor configured to control the sensor module 1440 as a part of or separately from the application processor 1410, and may control the sensor module 1440 while the application processor 1410 is in a sleep state.

The input device 1450 includes a touch panel 1452, a (digital) pen sensor 1454, a key 1456, and an ultrasonic input unit 1458. The touch panel 1452 may use at least one of, for example, a capacitive scheme, a resistive scheme, an infrared scheme, and an ultrasonic scheme. Further, the touch panel 1452 may further include a control circuit. The touch panel 1452 may further include a tactile layer and provide a tactile reaction to the user.

The (digital) pen sensor 1454 may include, for example, a recognition sheet which is a part of the touch panel or is separated from the touch panel. The key 1456 may include, for example, a physical button, an optical key or a keypad. The ultrasonic input device 1458 may detect ultrasonic waves generated by an input tool through a microphone 1488 and identify data corresponding to the detected ultrasonic waves.

The display 1460 (for example, the display 160) may include a panel 1462, a hologram device 1464 or a projector 1466. The panel 1462 may include a configuration identical or similar to that of the display 160 illustrated in FIG. 1. The panel 1462 may be implemented to be, for example, flexible, transparent, or wearable. The panel 1462 and the touch panel 1452 may be implemented as one module. The hologram 1464 may show a three dimensional image in the air by using an interference of light. The projector 1466 may display an image by projecting light onto a screen. The screen may be located, for example, in the interior of or on the exterior of the electronic device 1401. The display 1460 may further include a control circuit for controlling the panel 1462, the hologram device 1464, or the projector 1466.

The interface 1470 may include, for example, a high-definition multimedia interface (HDMI) 1472, a universal serial bus (USB) 1474, an optical interface 1476, or a D-subminiature (D-sub) 1478. The interface 1470 may be included in, for example, the communication interface 170 illustrated in FIG. 1. Additionally or alternatively, the interface 1470 may include, for example, a mobile high-definition link (MHL) interface, a secure digital (SD) card/multimedia card (MMC) interface, or an infrared data association (IrDA) standard interface.

The audio module 1480 may bidirectionally convert, for example, a sound and an electrical signal. At least some elements of the audio module 1480 may be included in, for example, the input/output interface 150 illustrated in FIG. 1. The audio module 1480 may process sound information which is input or output through, for example, a speaker 1482, a receiver 1484, earphones 1486, the microphone 1488 and the like.

The camera module 1491 is a device which may photograph a still image and a dynamic image. According to an embodiment of the present disclosure, the camera module 291 may include one or more image sensors (for example, a front sensor or a back sensor), a lens, an image signal processor (ISP) or a flash (for example, LED or xenon lamp).

The power management module 1495 may manage, for example, power of the electronic device 1401. According to an embodiment of the present disclosure, the power management module 1495 may include a power management integrated circuit (PMIC), a charger integrated circuit (IC), or a battery gauge. The PMIC may use a wired and/or wireless charging method. Examples of the wireless charging method may include, for example, a magnetic resonance method, a magnetic induction method, an electromagnetic wave method, and the like. Additional circuits, for example, a coil loop, a resonance circuit, a rectifier, and the like for wireless charging may be further included. The battery gauge may measure, for example, a residual quantity of the battery 1496 charge, and a voltage, a current, or a temperature during the charging. The battery 1496 may include, for example, a rechargeable battery or a solar battery.

The indicator 1497 may indicate a particular state (for example, a booting state, a message state, a charging state, and the like) of the electronic device 1401 or a part (for example, the processor 1410) of the electronic device 1401. The motor 1498 may convert an electrical signal into mechanical vibration, and may generate vibration, a haptic effect, and the like. The electronic device 1401 may include a processing unit (for example, a GPU) for supporting a mobile television (TV). The processing unit for supporting mobile TV may process, for example, media data according to a certain standard such as digital multimedia broadcasting (DMB), digital video broadcasting (DVB), or MediaFlo™.

Each of the above-described component elements of hardware according to an embodiment of the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components may be combined into one entity, which may perform functions similar or identical to those of the relevant components before the combination.

The term "module" as used herein may refer to a unit including one of hardware, software, or firmware or a combination of two or more of them. The term "module" may be used interchangeably used with, for example, the terms "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to an embodiment of the present disclosure may include at least one of an application-specific integrated circuit (ASIC) chip, a field-programmable gate arrays (FPGA), and a programmable-logic device for performing operations which are known or are to be developed hereinafter.

According to various embodiments of the present disclosure, at least some of the devices (for example, modules or functions thereof) or the method (for example, operations) may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high level language codes, which may be executed in a computer by using an interpreter, as well as machine codes made by a compiler. The aforementioned hardware device may be configured to operate as one or more software modules in order to perform the operation of the present disclosure, and vice versa.

The programming module according to an embodiment of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium storing commands is provided. The commands are configured to instruct one or more processors to execute one or more operations when being executed by the one or more processors. The one or more operations may include an operation of acquiring virtual device information associated with a second electronic device and connection information between the second electronic device and one or more third electronic devices, which is generated based on the virtual device information and an operation of making a connection with the one or more third electronic devices through short range wireless communication by using the virtual device information and the connection information.

Various embodiments disclosed herein are provided merely to describe technical details of the present disclosure and to help in the understanding of the present disclosure, and do not limit the scope of the present disclosure. Accordingly, the scope of the present disclosure should be construed as including all modifications or various other embodiments based on the technical idea of the present disclosure as defined by the following claims and their equivalents.

What is claimed is:

1. A non-transitory computer-readable recording medium having a program recorded thereon to be executed in a computer, the program comprising executable commands to instruct a processor included in a first electronic device to execute operations, the operations comprising:
   acquiring a virtual media access control (MAC) address of a second electronic device and connection information between the second electronic device and one or more third electronic devices while the second electronic device communicates with the one or more third electronic devices based on the virtual MAC address, wherein the connection information is generated by the second electronic device, based on the virtual MAC address of the second electronic device, and wherein the virtual MAC address of the second electronic device is generated or obtained from an external server by the second electronic device;
   changing a preset MAC address of the first electronic device by setting the virtual address of the second electronic device as a MAC address of the first electronic device; and
   establishing a connection with the one or more third electronic devices through short range wireless communication using the changed MAC address of the first electronic device instead of the preset MAC address for the first electronic device and the connection information.

2. The non-transitory computer-readable recording medium of claim 1, wherein the executable commands instruct the processor to further execute operations, the operations comprising:
   identifying a fourth electronic device, which may be connected to the one or more third electronic devices through the short range wireless communication; and transmitting the virtual MAC address of the second electronic device and the connection information to the fourth electronic device.

3. The non-transitory computer-readable recording medium of claim 2, wherein establishing the connection with the one or more third electronic devices through the short range wireless communication comprises:
setting device information of the first electronic device as the virtual MAC address.

4. The non-transitory computer-readable recording medium of claim 3, wherein the executable commands instruct the processor to further execute operations, the operations comprising:
when the virtual MAC address of the second electronic device and the connection information are transmitted to the fourth electronic device, setting the device information of the first electronic device as unique device information of the first electronic device.

5. The non-transitory computer-readable recording medium of claim 1, wherein the virtual MAC address of the second electronic device includes at least one of a virtual medium access control (MAC) address, a virtual serial number, a virtual universally unique identifier (UUID), and a virtual world wide port name (WWPN).

6. The non-transitory computer-readable recording medium of claim 1, wherein the virtual MAC address of the second electronic device corresponds to virtual MAC address assigned to a user account associated with the second electronic device.

7. The non-transitory computer-readable recording medium of claim 1, wherein acquiring the virtual MAC address and the connection information comprises:
acquiring the virtual MAC address of the second electronic device and the connection information from the external server, and
wherein the external server manages the virtual MAC address of the second electronic device, the connection information, and the second electronic device.

8. The non-transitory computer-readable recording medium of claim 1, wherein establishing the connection with the one or more third electronic devices through the short range wireless communication comprises:
using a network configuration based on the virtual MAC address of the second electronic device and the connection information.

9. The non-transitory computer-readable recording medium of claim 8, wherein the executable commands instructs the processor to further execute operations, the operations comprising:
identifying a fourth electronic device, which may be connected to the one or more third electronic devices through the short range wireless communication by using the network configuration; and
when profile information corresponding to a capability of the fourth electronic device is selected from one or more pieces of preset profile information for the network configuration, transmitting the virtual MAC address of the second electronic device and connection information corresponding to the selected profile to the fourth electronic device.

10. The non-transitory computer-readable recording medium of claim 9, wherein the one or more pieces of profile information include information indicating roles of the first electronic device and the one or more third electronic devices.

11. A first electronic device comprising:
a communication module; and
a processor configured to:
acquire a virtual media access control (MAC) address of a second electronic device and connection information between the second electronic device and one or more third electronic devices while the second electronic device communicates with the one or more third electronic devices based on the virtual MAC address, wherein the connection information is generated by the second electronic device, based on the virtual MAC address of the second electronic device, and wherein the virtual MAC address of the second electronic device is generated or obtained from an external server by the second electronic device,
change a preset MAC address of the first electronic device by setting the virtual address of the second electronic device as a MAC address of the first electronic device; and
establish a connection with the one or more third electronic devices through short range wireless communication using the changed MAC address of the first electronic device instead of the preset MAC address for the first electronic device and the connection information through the communication module.

12. The first electronic device of claim 11, wherein the processor is further configured to identify a fourth electronic device, which may be connected to the one or more third electronic devices through the short range wireless communication and transmits the virtual MAC address of the second electronic device and the connection information to the fourth electronic device through the communication module.

13. The first electronic device of claim 12, wherein the processor is further configured to set device information of the first electronic device as the virtual MAC address of the second electronic device.

14. The first electronic device of claim 13, wherein, when the virtual MAC address and the connection information are transmitted to the fourth electronic device, the processor is further configured to set the device information of the first electronic device as unique device information of the first electronic device.

15. The first electronic device of claim 11, wherein the virtual MAC address includes at least one of a virtual medium access control (MAC) address, a virtual serial number, a virtual universally unique identifier (UUID), and a virtual world wide port name (WWPN).

16. The first electronic device of claim 11, wherein the virtual MAC address corresponds to a virtual MAC address assigned to a user account associated with the second electronic device.

17. A non-transitory computer-readable recording medium having a program recorded therein to be executed in a computer, the program comprising executable commands to instruct a processor included in a second electronic device to execute operations, the operations comprising:
obtaining a virtual media access control (MAC) address corresponding to a user account associated with the second electronic device from an external server while the second electronic device communicates with the one or more third electronic devices based on the virtual MAC address;
generating connection information between the second electronic device and one or more third electronic devices based on the virtual MAC address;

establishing a connection with the one or more third electronic devices through short range wireless communication by using the connection information; and transmitting the virtual MAC address and the connection information to a first electronic device such that the first electronic device changes a MAC address of the first electronic device instead of the preset MAC address for the first electronic device by setting the virtual address of the second electronic device as a MAC address of the first electronic device.

18. The non-transitory computer-readable recording medium of claim 17 wherein establishing the connection with the one or more third electronic devices through the short range wireless communication comprises establishing the connection using a network configuration based on the virtual MAC address and the connection information.

19. The non-transitory computer-readable recording medium of claim 18, wherein establishing the connection with the one or more third electronic devices comprises generating one or more pieces of profile information indicating roles of the second electronic device and the one or more third electronic devices in the network based on a capability of each of the second electronic device and the one or more third electronic devices.

* * * * *